(12) United States Patent
Zhang

(10) Patent No.: US 11,394,607 B2
(45) Date of Patent: Jul. 19, 2022

(54) METHOD AND SYSTEM FOR NETWORK CONFIGURATION

(71) Applicant: HUAWEI TECHNOLOGIES CO., LTD., Guangdong (CN)

(72) Inventor: Yongkang Zhang, Nanjing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/093,696

(22) Filed: Nov. 10, 2020

(65) Prior Publication Data
US 2021/0058292 A1    Feb. 25, 2021

Related U.S. Application Data

(63) Continuation of application No. PCT/CN2019/085148, filed on Apr. 30, 2019.

(30) Foreign Application Priority Data

May 11, 2018   (CN) .......................... 201810451317.5

(51) Int. Cl.
*H04L 41/0806* (2022.01)
*H04L 41/084* (2022.01)
(Continued)

(52) U.S. Cl.
CPC ........ *H04L 41/0806* (2013.01); *G06F 15/173* (2013.01); *H04L 29/00* (2013.01);
(Continued)

(58) Field of Classification Search
CPC ..... G06F 15/173; G06F 9/4881; H04L 29/00; H04L 41/0806; H04L 41/0843;
(Continued)

(56) References Cited

U.S. PATENT DOCUMENTS 6,336,138 B1    1/2002  Caswell et al.
2006/0050862 A1*  3/2006  Shen ................ H04Q 3/0062
                                                         379/219
(Continued)

FOREIGN PATENT DOCUMENTS

CN      103580797 A      2/2014
CN      106576054 A      4/2017
WO      2017162089 A1    9/2017

OTHER PUBLICATIONS

Charles Clos,"A Study of Non-Blocking Switching Networks", Manuscript received Oct. 30, 1952, total 19 pages.
(Continued)

*Primary Examiner* — Le H Luu
(74) *Attorney, Agent, or Firm* — Womble Bond Dickinson (US) LLP

(57) ABSTRACT

This application provides a network configuration method, a device, and a system. The method implemented by a primary device includes: obtaining a configuration template file based on a type of a to-be-configured network device, where the configuration template file corresponds to a network device of a same type and includes at least one configuration command indicating a relationship between a configuration parameter of the to-be-configured network device and a configuration parameter of another network device; generating instantiated configuration data of the to-be-configured network device based on the configuration parameter and the at least one configuration command; and sending the instantiated configuration data to the to-be-configured network device, where the instantiated configuration data is used to instruct the to-be-configured network device to perform configuration based on the instantiated configuration data, to implement configuration automation. This not only
(Continued)

improves configuration efficiency of a network device, but also improves configuration accuracy.

18 Claims, 15 Drawing Sheets

(51) Int. Cl.
*H04L 41/08* (2022.01)
*H04L 69/00* (2022.01)
*G06F 15/173* (2006.01)
*H04L 67/10* (2022.01)

(52) U.S. Cl.
CPC ...... *H04L 41/0843* (2013.01); *H04L 41/0846* (2013.01); *H04L 41/0886* (2013.01); *H04L 41/0889* (2013.01); *H04L 67/10* (2013.01)

(58) Field of Classification Search
CPC ............ H04L 41/0846; H04L 41/0886; H04L 41/0889; H04L 67/10; H04L 67/125; H04L 12/4641; H04L 61/2015; G01R 31/318314; G06Q 10/087; H04Q 3/0062
See application file for complete search history.

(56) References Cited

U.S. PATENT DOCUMENTS

| | | | | |
|---|---|---|---|---|
| 2006/0190575 | A1* | 8/2006 | Harvey | H04L 67/125 709/222 |
| 2007/0214178 | A1* | 9/2007 | Sheffler | G01R 31/318314 |
| 2010/0042708 | A1* | 2/2010 | Stamler | G06Q 10/087 709/221 |
| 2010/0142410 | A1* | 6/2010 | Huynh Van | H04L 12/4641 370/255 |
| 2014/0376402 | A1 | 12/2014 | Dutt et al. | |
| 2015/0237002 | A1* | 8/2015 | Baniqued | H04L 61/2015 709/220 |
| 2015/0295759 | A1 | 10/2015 | Llersten | |
| 2016/0050116 | A1* | 2/2016 | Sheshadri | H04L 67/10 709/221 |
| 2016/0373290 | A1 | 12/2016 | Liu | |
| 2018/0109421 | A1* | 4/2018 | Laribi | H04L 41/0843 |
| 2019/0303213 | A1* | 10/2019 | Chaganti | G06F 9/4881 |

OTHER PUBLICATIONS

T. Eckert, Ed et al,"An Autonomic Control Plane (ACP) draft-ietf-anima-autonomic-control-plane-13", ANIMA WG Internet-Draft, Dec. 17, 2017, total 109 pages.

M. Pritikin et al,"Bootstrapping Remote Secure Key Infrastructures (BRSKI) draft-ietf-anima-bootstrapping-keyinfia-09", ANIMA WG Internet-Draft, Oct. 30, 2017, total 69 pages.

M. Pritikin et al,"Bootstrapping Remote Secure Key Infrastructures (BRSKI) draft-ietf-anima-bootstrapping-keyinfia-12", ANIMA WG Internet-Draft, Mar. 5, 2018, total 87 pages.

C. Bormann,"A Generic Autonomic Signaling Protocol (GRASP) draft-ietf-anima-grasp-15", Network Working Group Internet-Draft, Jul. 7, 2017, total 81 pages.

M. Behringer, Ed. et al,"A Reference Model for Autonomic Networking draft-ietf-anima-reference-model-06", ANIMA Internet-Draft, Feb. 23, 2018, total 30 pages.

K. Watsen et al,"Voucher Profile for Bootstrapping Protocols draft-ietf-anima-voucher-07", ANIMA Working Group Internet-Draft, Jan. 24, 2018, total 22 pages.

M. Mahalingam et al,"Virtual extensible Local Area Network (VXLAN): A Framework for Overlaying Virtualized Layer 2 Networks over Layer 3 Networks", Independent Submission, Request for Comments: 7348, Aug. 2014, total 22 pages.

M. Behringer et al,"Autonomic Networking: Definitions and Design Goals", Internet Research Task Force (IRIF), Request for Comments: 7575, Jun. 2015, total 16 pages.

S. Jiang et al,"General Gap Analysis for Autonomic Networking", Internet Research Task Force (IRTF), Request for Comments: 7576, Jun. 2015, total 17 pages.

Jeffrey O.Kephart et al,"The vision of autonomic computing", Published by the IEEE Computer Society, Jan. 2003, total 10 pages.

* cited by examiner

```
┌─────────────────┐                              ┌─────────────────┐
│       Key       │                              │ Implementation  │
│   requirement   │                              │    mechanism    │
└─────────────────┘                              └─────────────────┘
```

| Key requirement | Implementation mechanism |
|---|---|
| A configuration file is templatized/parameterized | This requirement is implemented by defining a macro and parameterizing a command line |
| Same configuration parameters need to be allocated in a unified manner in a DCN to avoid a conflict | This requirement is implemented by performing configuration parameter resource pooling and using the macro to allocate and reference a resource value |
| A parameter of a configuration command needs to reflect a final status, and is irrelevant to an operation timing | This requirement is implemented by delaying instantiation and canceling timing dependency |
| Automatically generating configuration data according to a rule needs to be supported, and the configuration data is updated accordingly | 1. This requirement is implemented by using a well-known macro or a pre-defined target object set<br>2. This requirement is implemented by instantiating a requirement and selecting a command set based on a deployment/installation status<br>3. This requirement is implemented by performing instantiation repeatedly to support generation of the configuration data based on a type instead of an instance<br>4. This requirement is implemented by delaying instantiation to sense capacity expansion of the target object set, and dynamically update the configuration data |
| Calculating and generating a paired configuration command on a related device according to a peer relationship needs to be supported, and the paired configuration command is updated accordingly | This requirement may be implemented by defining a peer relationship by using a peer group |
| (Optional) After instantiation configuration is complete and before instantiated configuration data is actually loaded, submit the instantiated configuration data to an administrator to confirm content of the instantiated configuration data, to prevent the generated instantiated configuration data from being incorrect | This requirement is implemented by using a dry-run mechanism |

FIG. 3

| |
|---|
| # Configure a VXLAN Layer 3 gateway optimization command for a network device |
| # Install an E-series interface board |
| assign forward nvo3 acl extend enable |
| assign forward nvo3 service extend enable |
| assign forward nvo3-gateway enhanced L3 |
| # |
| # Install an F-series FD/FDA-type interface board |
| assign forward nvo3 acl extend enable |
| set forward capability enhanced |
| set serdes capability enhanced |
| # |
| #Mixedly insert an E-series board and an F-series board (not recommended) |
| assign forward nvo3 acl extend enable |
| assign forward nvo3 service extend enable |
| assign forward nvo3-gateway enhanced L3 |
| assign forward nvo3-flinecard capability enable |
| # |

FIG. 4

| |
|---|
| # Configure a TOR to work in a large routing table mode to enhance a routing entry specification |
| system resource large-route |

FIG. 5

METHOD AND SYSTEM FOR NETWORK CONFIGURATION

CROSS-REFERENCE TO RELATED APPLICATIONS

This application is a continuation of International Application No. PCT/CN2019/085148, filed on Apr. 30, 2019, which claims priority to Chinese Patent Application No. 201810451317.5, filed on May 11, 2018. The disclosures of the aforementioned applications are hereby incorporated by reference in their entireties.

TECHNICAL FIELD

This application relates to the field of communications technologies, and in particular, to a network configuration method, a device, and a system.

BACKGROUND

In a data center network (DCN), a spine-leaf network architecture is a mainstream architecture of the DCN, and the spine-leaf network architecture is also referred to as a distributed core architecture. The spine-leaf network architecture usually includes a spine device and a leaf device. The spine device is used as a backbone device in the spine-leaf network architecture, and is mainly responsible for connecting to each leaf device. In addition, each spine device is connected to each leaf device. The leaf device is used as an access device in the spine-leaf network architecture, and is mainly responsible for connecting to a device, for example, a server.

A connection relationship and a function corresponding to the spine device or the leaf device in the spine-leaf network architecture are determined based on a device role type (a spine or a leaf). Configuration parameters of network devices with a same device role type are highly similar. In the spine-leaf architecture, a large quantity of network devices are deployed to provide powerful network transmission resources for clients. Before the large quantity of network devices are deployed to provide the network transmission resources for the clients, each network device needs to be configured first. In the prior art, an administrator manually generates and delivers configuration data corresponding to each of the large quantity of network devices. Configuration data corresponding to devices of a same role type is similar. Therefore, when the administrator manually generates the configuration data of each device, configuration efficiency is low, and an error is likely to occur during configuration, thereby resulting in low configuration accuracy.

SUMMARY

This application provides a network configuration method, a device, and a system, to automatically configure a network device, so as to improve configuration efficiency and configuration accuracy of the network device.

According to a first aspect, an embodiment of this application provides a network configuration method. The method may include:

obtaining, by a primary network device, a configuration template file based on a type of a to-be-configured network device, where the configuration template file corresponds to a network device of a same type, the configuration template file includes at least one configuration command, and the at least one configuration command is used to indicate a relationship between a configuration parameter of the to-be-configured network device and a configuration parameter of another network device; generating instantiated configuration data of the to-be-configured network device based on the configuration parameter of the to-be-configured network device and the at least one configuration command; and then sending the instantiated configuration data to the to-be-configured network device, so that the to-be-configured network device performs configuration based on the instantiated configuration data. The instantiated configuration data is used to instruct the to-be-configured network device to perform configuration based on the instantiated configuration data.

It can be learned that according to the network configuration method provided in this embodiment of this application, the configuration command in the configuration template file indicates the relationship between the configuration parameter of the to-be-configured network device and the configuration parameter of the another network device. Therefore, the primary network device can generate the instantiated configuration data of the to-be-configured network device directly based on the configuration parameter of the to-be-configured network device and the at least one configuration command, and send the instantiated configuration data to the to-be-configured network device, so that the to-be-configured network device performs matching configuration based on the instantiated configuration data. In this case, an administrator does not need to manually generate configuration data of each device, thereby implementing configuration automation. This not only improves configuration efficiency of a network device, but also improves configuration accuracy.

In an embodiment, the at least one configuration command includes a first configuration command, and the generating, by the primary network device, instantiated configuration data of the to-be-configured network device based on the configuration parameter of the to-be-configured network device and the at least one configuration command includes: obtaining, by the primary network device, a parameter of a first network device based on the first configuration command, where the first configuration command is used to indicate a relationship between the configuration parameter of the to-be-configured network device and the parameter of the first network device; and when the primary network device obtains the parameter of the first network device, generating, by the primary network device, the instantiated configuration data of the to-be-configured network device based on the configuration parameter of the to-be-configured network device, the first configuration command, and the parameter of the first network device.

It can be learned that when the primary network device can obtain the parameter of the first network device, the primary network device can generate the instantiated configuration data of the to-be-configured network device directly based on the configuration parameter of the to-be-configured network device, the first configuration command, and the parameter of the first network device. This helps further improve efficiency of automatic configuration.

In an embodiment, the method may further include:

when the primary network device cannot obtain the parameter of the first network device, sending, by the primary network device, the configuration parameter of the to-be-configured network device and the first configuration command to the to-be-configured network device, so that the to-be-configured network device generates the instantiated configuration data based on the configuration parameter of the to-be-configured network device and the first configuration command, and performs configuration based on the instantiated configuration data.

It can be learned that when the primary network device cannot obtain the parameter of the first network device and cannot generate the instantiated configuration data of the to-be-configured network device, the primary network device may send the configuration parameter of the to-be-configured network device and the first configuration command to the to-be-configured network device, so that the to-be-configured network device generates the instantiated configuration data based on the configuration parameter of the to-be-configured network device and the first configuration command. This avoids a case in which configuration cannot be performed, and helps further improve reliability of automatic configuration. In addition, the primary network device does not need to obtain the parameter of the first network device and generate the instantiated configuration data. This reduces complexity of the primary network device.

In an embodiment, when the instantiated configuration data includes resource data, the method may further include:

receiving, by the primary network device, the resource data sent by the to-be-configured network device, where the resource data is resource data generated in a process in which the to-be-configured network generates the instantiated configuration data.

The resource data is global resource data, for example, address information. The primary network device receives the resource data, so that the primary network device can learn of the resource data allocated to the to-be-configured network device. This avoids allocating the resource data to another network device, and further ensures uniqueness of the resource data.

In an embodiment, after the sending, by the primary network device, the instantiated configuration data to the to-be-configured network device, the method may further include:

receiving, by the primary network device, a confirmation response message, where the confirmation response message is used to indicate that the instantiated configuration data is correct.

It can be learned that, an injection network device or the administrator confirms the instantiated configuration data, so that a problem caused by incorrect content of the instantiated configuration data during loading can be avoided. In addition, the administrator may also review network deployment again, to ensure that the instantiated configuration data received by the to-be-configured network device is correct, and further improve correctness and accuracy of configuration of the to-be-configured network device.

In an embodiment, before the obtaining, by a primary network device, a configuration template file based on a type of a to-be-configured network device, the method may further include:

comparing, by the primary network device, attribute information of the primary network device with attribute information of another network device of a type to which the primary network device belongs; and determining that the attribute information of the primary network device meets a first preset condition. To be specific, the configuration template file can be obtained based on the type of the to-be-configured network device only after it is determined that the primary network device is the primary network device.

In an embodiment, the obtaining, by a primary network device, a configuration template file based on a type of a to-be-configured network device may include:

receiving, by the primary network device, at least one configuration template file from a second network device, where the second network device is any network device in a network; and determining the configuration template file in the at least one configuration template file based on the type of the to-be-configured network device. The administrator does not need to determine the primary network device based on an attribute of each network device, but randomly sends the at least one configuration template file to the second network device. Then, the second network device sends the at least one configuration template file to the primary network device. This reduces operation complexity of the administrator.

In an embodiment, after the obtaining, by a primary network device, a configuration template file based on a type of a to-be-configured network device, the method may further include:

determining, by the primary network device, a backup network device based on a second preset condition, where a type of the backup network device is different from the type of the primary network device; and sending a first backup indication message to the backup network device, where the first backup indication message includes the configuration template file, and the first backup indication message is used to indicate the backup network device to back up the configuration template file. The configuration template file is backed up by using the backup network device, to improve security and reliability of the configuration template file.

In an embodiment, after the sending, by the primary network device, the instantiated configuration data to the to-be-configured network device, the method may further include:

sending, by the primary network device, a second backup indication message to the backup network device, where the second backup indication message includes dynamic data generated in the process of generating the instantiated configuration data, and the second backup indication message is used to indicate the backup network device to back up the dynamic data. The dynamic data is backed up by using the backup network device, to improve security and reliability of the dynamic data.

In an embodiment, the method may further include:

when determining that a third network device joins in the network, determining, by the primary network device, a type of the third network device; when the type of the third network device is the same as the type of the primary network device, comparing, by the primary network device, attribute information of the third network device with the attribute information of the primary network device; and when the attribute information of the primary network device meets the first preset condition, generating, by the primary network device, instantiated configuration data of the third network device based on a configuration parameter of the third network device and a configuration command in a configuration template file corresponding to the type of the third network device. In this way, when the third network device is newly joined, if it is determined that the primary network device is not switched, the primary network device still needs to generate the instantiated configuration data of the third network device based on the configuration parameter of the third network device and the configuration command in the configuration template file corresponding to the type of the third network device, so that the third network device performs matching configuration based on the instantiated configuration data. In this case, the administrator does not need to manually generate the configuration data of each device. This not only improves configuration efficiency of a network device, but also improves configuration accuracy.

In an embodiment, the method may further include:

when the attribute information of the third network device meets the first preset condition, determining, by the primary network device, that the third network device is a new primary network device, and clearing the instantiated configuration data. This reduces complexity of the primary network device.

In an embodiment, the method may further include:

when the type of the third network device is different from the type of the primary network device, comparing, by the primary network device, the attribute information of the third network device with attribute information of the backup network device; when the attribute information of the third network device meets the second preset condition, determining, by the primary network device, that the third network device is a new backup network device; and sending, by the primary network device, the configuration template file to the new backup network device. In this way, when the third network device is newly joined, if it is determined to switch the backup network device, the primary network device sends the configuration template file to the new backup network device, to back up the configuration template file by using the new backup network device. This improves reliability and security of the configuration template file.

In an embodiment, the method may further include:

when the attribute information of the third network device does not meet the second preset condition, generating, by the primary network device, the instantiated configuration data of the third network device based on the configuration parameter of the third network device and the configuration command in the configuration template file corresponding to the type of the third network device; and sending the instantiated configuration data to the third network device.

In an embodiment, the configuration template file is generated through offline editing.

In an embodiment, the third backup network device is a network device that the instantiated configuration data is not configured.

According to a second aspect, an embodiment of this application further provides a network configuration method. The network configuration method may include:

receiving, by a to-be-configured network device, instantiated configuration data sent by a primary network device, where the instantiated configuration data is generated by the primary network device based on a configuration parameter of the to-be-configured network device and at least one configuration command included in a configuration template file, the configuration template file is obtained by the primary network device based on a type of the to-be-configured network device, the configuration template file corresponds to a network device of a same type, and the configuration command is used to indicate a relationship between the configuration parameter of the to-be-configured network device and a configuration parameter of another network device; and configuring the to-be-configured network device based on the instantiated configuration data.

It can be learned that according to the network configuration method provided in this embodiment of this application, the configuration command in the configuration template file indicates the relationship between the configuration parameter of the to-be-configured network device and the configuration parameter of the another network device. Therefore, the primary network device can generate the instantiated configuration data of the to-be-configured network device directly based on the configuration parameter of the configuration network device and the at least one configuration command, and send the instantiated configuration data to the to-be-configured network device, so that the to-be-configured network device performs matching configuration based on the instantiated configuration data. In this case, an administrator does not need to manually generate configuration data of each device. This not only improves configuration efficiency of a network device, but also improves configuration accuracy.

In an embodiment, the at least one configuration command includes a first configuration command, the first configuration command is used to indicate a relationship between the configuration parameter of the to-be-configured network device and a parameter of a first network device, and when the primary network device cannot obtain the parameter of the first network device, the method may further include:

receiving, by the to-be-configured network device, the configuration parameter of the to-be-configured network device and the first configuration command that are sent by the primary network device; obtaining the parameter of the first network device based on the first configuration command; and then generating the instantiated configuration data based on the configuration parameter of the to-be-configured network device, the first configuration command, and the parameter of the first network device.

It can be learned that when the primary network device cannot obtain the parameter of the first network device, the primary network device may directly send the configuration parameter of the to-be-configured network device and the first configuration command to the to-be-configured network, so that the to-be-configured network device receives the configuration parameter of the to-be-configured network device and the first configuration command that are sent by the primary network device, and generates the instantiated configuration data based on the configuration parameter of the to-be-be-configured network device and the first configuration command. Similarly, the administrator does not need to manually generate configuration data of each device. This not only improves configuration efficiency of a network device, but also improves configuration accuracy. In addition, the primary network device does not need to obtain the parameter of the first network device and generate the instantiated configuration data. This reduces complexity of the primary network device.

In an embodiment, when the instantiated configuration data includes resource data, and after the to-be-configured network device generates the instantiated configuration based on the configuration parameter of the to-be-configured network device and the first configuration command, the method may further include:

sending, by the to-be-configured network device, the resource data to the primary network device, where the resource data is resource data generated in a process in which the to-be-configured network generates the instantiated configuration data.

The resource data is global resource data, for example, address information. The to-be-configured network device sends the resource data to the primary network device, so that the primary network device can learn of the resource data allocated to the to-be-configured network device. This avoids allocating the resource data to another network device, and further ensures uniqueness of the resource data.

In an embodiment, the configuration template file is generated through offline editing.

According to a third aspect, an embodiment of this application further provides a network device, and the network device may include:

a processing unit, configured to obtain a configuration template file based on a type of a to-be-configured network device, where the configuration template file corresponds to a network device of a same type, the configuration template file includes at least one configuration command, and the at least one configuration command is used to indicate a relationship between a configuration parameter of the to-be-configured network device and a configuration parameter of another network device; where the processing unit is further configured to generate instantiated configuration data of the to-be-configured network device based on the configuration parameter of the to-be-configured network device and the at least one configuration command; and a sending unit, configured to send the instantiated configuration data to the to-be-configured network device, where the instantiated configuration data is used to instruct the to-be-configured network device to perform configuration based on the instantiated configuration data.

In an embodiment, the at least one configuration command includes a first configuration command, and the processing unit is specifically configured to: obtain a parameter of a first network device based on the first configuration command, where the first configuration command is used to indicate a relationship between the configuration parameter of the to-be-configured network device and the parameter of the first network device; and when the parameter of the first network device is obtained, generate the instantiated configuration data of the to-be-configured network device based on the configuration parameter of the to-be-configured network device, the first configuration command, and the parameter of the first network device.

In an embodiment, the processing unit is further specifically configured to: when the parameter of the first network device cannot be obtained, send the configuration parameter of the to-be-configured network device and the first configuration command to the to-be-configured network device, so that the to-be-configured network device generates the instantiated configuration data based on the configuration parameter of the to-be-configured network device and the first configuration command, and performs configuration based on the instantiated configuration data.

In an embodiment, the network device may further include:

a receiving unit, configured to receive a confirmation response message, where the confirmation response message is used to indicate that the instantiated configuration data is correct.

In an embodiment, the processing unit is further configured to: compare attribute information of a primary network device with attribute information of another network device of a type to which the primary network device belongs; and determine that the attribute information of the primary network device meets a first preset condition.

In an embodiment, the processing unit is specifically configured to: receive at least one configuration template file sent by a second network device, where the second network device is any network device in a network; and determine the configuration template file in the at least one configuration template file based on the type of the to-be-configured network device.

In an embodiment, the processing unit is further configured to determine a backup network device based on a second preset condition, where a type of the backup network device is different from the type of the primary network device; and the sending unit is further configured to send a first backup indication message to the backup network device, where the first backup indication message includes the configuration template file, and the first backup indication message is used to indicate the backup network device to back up the configuration template file.

In an embodiment, the processing unit is further configured to: when it is determined that a third network device joins in the network, determine a type of the third network device; and when the type of the third network device is the same as the type of the primary network device, compare attribute information of the third network device with the attribute information of the primary network device; and the processing unit is further configured to: when the attribute information of the primary network device meets the first preset condition, generate instantiated configuration data of the third network device based on a configuration parameter of the third network device and a configuration command in a configuration template file corresponding to the type of the third network device.

In an embodiment, the processing unit is further configured to: when the attribute information of the third network device meets the first preset condition, determine that the third network device is a new primary network device, and clear the instantiated configuration data.

In an embodiment, the processing unit is further configured to: when the type of the third network device is different from the type of the primary network device, compare the attribute information of the third network device with attribute information of the backup network device; and when the attribute information of the third network device meets the second preset condition, determine that the third network device is a new backup network device; and the sending unit is further configured to send the configuration template file to the new backup network device.

In an embodiment, the processing unit is further configured to: when the attribute information of the third network device does not meet the second preset condition, generate, by the primary network device, the instantiated configuration data of the third network device based on the configuration parameter of the third network device and the configuration command in the configuration template file corresponding to the type of the third network device; and the sending unit is further configured to send the instantiated configuration data to the third network device.

According to a fourth aspect, an embodiment of this application further provides a to-be-configured network device, and the to-be-configured network device may include:

a receiving unit, configured to receive instantiated configuration data sent by a primary network device, where the instantiated configuration data is generated by the primary network device based on a configuration parameter of the to-be-configured network device and at least one configuration command included in a configuration template file, the configuration template file is obtained by the primary network device based on a type of the to-be-configured network device, the configuration template file corresponds to a network device of a same type, and the configuration command is used to indicate a relationship between the configuration parameter of the to-be-configured network device and a configuration parameter of another network device; and a processing unit, configured to configure the to-be-configured network device based on the instantiated configuration data.

In an embodiment, the at least one configuration command includes a first configuration command, the first configuration command is used to indicate a relationship between the configuration parameter of the to-be-configured network device and a parameter of a first network device, and when the primary network device cannot obtain the parameter of the first network device, the receiving unit is further configured to receive the configuration parameter of the to-be-configured network device and the first configuration command that are sent by the primary network device; and the processing unit is configured to: obtain the parameter of the first network device based on the first configuration command; and generate the instantiated configuration data based on the configuration parameter of the to-be-configured network device, the first configuration command, and the parameter of the first network device.

In an embodiment, when the instantiated configuration data includes resource data, the to-be-configured network device may further include:

a sending unit, configured to send the resource data to the primary network device, where the resource data is resource data generated in a process in which the to-be-configured network generates the instantiated configuration data.

According to a fifth aspect, an embodiment of this application further provides a network device, and the network device may include:

a processor, configured to obtain a configuration template file based on a type of a to-be-configured network device, where the configuration template file corresponds to a network device of a same type, the configuration template file includes at least one configuration command, and the at least one configuration command is used to indicate a relationship between a configuration parameter of the to-be-configured network device and a configuration parameter of another network device; where the processor is configured to generate instantiated configuration data of the to-be-configured network device based on the configuration parameter of the to-be-configured network device and the at least one configuration command; and a transceiver, configured to send the instantiated configuration data to the to-be-configured network device, where the instantiated configuration data is used to instruct the to-be-configured network device to perform configuration based on the instantiated configuration data.

In an embodiment, the at least one configuration command includes a first configuration command, and the processor is specifically configured to: obtain a parameter of a first network device based on the first configuration command, where the first configuration command is used to indicate a relationship between the configuration parameter of the to-be-configured network device and the parameter of the first network device; and when a primary network device obtains the parameter of the first network device, generate the instantiated configuration data of the to-be-configured network device based on the configuration parameter of the to-be-configured network device, the first configuration command, and the parameter of the first network device.

In an embodiment, the processor is further specifically configured to: when the parameter of the first network device cannot be obtained, send the configuration parameter of the to-be-configured network device and the first configuration command to the to-be-configured network device, so that the to-be-configured network device generates the instantiated configuration data based on the configuration parameter of the to-be-configured network device and the first configuration command, and performs configuration based on the instantiated configuration data.

In an embodiment, the transceiver is further configured to receive a confirmation response message, where the confirmation response message is used to indicate that the instantiated configuration data is correct.

In an embodiment, the processor is further configured to: compare attribute information of the primary network device with attribute information of another network device of a type to which the primary network device belongs; and determine that the attribute information of the primary network device meets a first preset condition.

In an embodiment, the transceiver is specifically configured to receive at least one configuration template file sent by a second network device, where the second network device is any network device in a network; and the processor is configured to determine the configuration template file in the at least one configuration template file based on the type of the to-be-configured network device.

In an embodiment, the processor is further configured to determine a backup network device based on a second preset condition, where a type of the backup network device is different from the type of the primary network device; and the transceiver is further configured to send a first backup indication message to the backup network device, where the first backup indication message includes the configuration template file, and the first backup indication message is used to indicate the backup network device to back up the configuration template file.

In an embodiment, the processor is further configured to: when it is determined that a third network device joins in the network, determine a type of the third network device; when the type of the third network device is the same as the type of the primary network device, compare attribute information of the third network device with the attribute information of the primary network device; and when the attribute information of the primary network device meets the first preset condition, generate instantiated configuration data of the third network device based on a configuration parameter of the third network device and a configuration command in a configuration template file corresponding to the type of the third network device.

In an embodiment, the processor is further configured to: when the attribute information of the third network device meets the first preset condition, determine that the third network device is a new primary network device, and clear the instantiated configuration data.

In an embodiment, the processor is further configured to: when the type of the third network device is different from the type of the primary network device, compare the attribute information of the third network device with attribute information of the backup network device; and when the attribute information of the third network device meets the second preset condition, determine that the third network device is a new backup network device; and the transceiver is configured to send the configuration template file to the new backup network device.

In an embodiment, the processor is further configured to: when the attribute information of the third network device does not meet the second preset condition, generate the instantiated configuration data of the third network device based on the configuration parameter of the third network device and the configuration command in the configuration template file corresponding to the type of the third network device; and the transceiver is configured to send the instantiated configuration data to the third network device.

According to a sixth aspect, an embodiment of this application further provides a to-be-configured network device, and the to-be-configured network device may include:

a transceiver, configured to receive instantiated configuration data sent by a primary network device, where the instantiated configuration data is generated by the primary network device based on a configuration parameter of the to-be-configured network device and at least one configuration command included in a configuration template file, the configuration template file is obtained by the primary network device based on a type of the to-be-configured network device, the configuration template file corresponds to a network device of a same type, and the configuration command is used to indicate a relationship between the configuration parameter of the to-be-configured network device and a configuration parameter of another network device; and a processor, configured to configure the to-be-configured network device based on the instantiated configuration data.

In an embodiment, the at least one configuration command includes a first configuration command, the first configuration command is used to indicate a relationship between the configuration parameter of the to-be-configured network device and a parameter of a first network device, and when the primary network device cannot obtain the parameter of the first network device, the transceiver is further configured to receive the configuration parameter of the to-be-configured network device and the first configuration command that are sent by the primary network device; and the processor is configured to obtain the parameter of the first network device based on the first configuration command; and generate the instantiated configuration data based on the configuration parameter of the to-be-configured network device, the first configuration command, and the parameter of the first network device.

In an embodiment, when the instantiated configuration data includes resource data, the transceiver is further configured to send the resource data to the primary network device, where the resource data is resource data generated in a process in which the to-be-configured network generates the instantiated configuration data.

According to a seventh aspect, an embodiment of this application further provides a network device. The network device includes a processor, a transceiver, a random access memory, a read-only memory, and a bus. The processor is separately coupled to a transmitter, the random access memory, and the read-only memory by using the bus. When the network device needs to be run, the network device is started by using a basic input/output system built into the read-only memory or a bootloader bootstrap system in an embedded system, to boot the network device to enter a normal running state. After the network device enters the normal running state, an application program and an operating system run in the random access memory, to enable the processor to perform the method in any one of the first aspect or the possible embodiments of the first aspect.

According to an eighth aspect, an embodiment of this application further provides a to-be-configured network device. The to-be-configured network device includes a processor, a transceiver, a random access memory, a read-only memory, and a bus. The processor is separately coupled to a transmitter, the random access memory, and the read-only memory by using the bus. When the to-be-configured network device needs to be run, the to-be-configured network device is started by using a basic input/output system built into the read-only memory or a bootloader bootstrap system in an embedded system, to boot the to-be-configured network device to enter a normal running state. After the to-be-configured network device enters the normal running state, an application program and an operating system run in the random access memory, to enable the processor to perform the method in any one of the second aspect or the possible embodiments of the second aspect.

According to a ninth aspect, an embodiment of this application further provides a network device. The network device includes a main control board and an interface board, and may further include a switching board. The network device is configured to perform the method in any one of the first aspect or the possible embodiments of the first aspect. Specifically, the network device includes modules configured to perform the method in any one of the first aspect or the possible embodiments of the first aspect.

According to a tenth aspect, an embodiment of this application further provides a to-be-configured network device. The to-be-configured network device includes a main control board and an interface board, and may further include a switching board. The to-be-configured network device is configured to perform the method in any one of the second aspect or the possible embodiments of the second aspect. Specifically, the to-be-configured network device includes modules configured to perform the method in any one of the second aspect or the possible embodiments of the second aspect.

According to an eleventh aspect, an embodiment of this application further provides a network configuration system. The network configuration system includes the network device in any one of the third aspect or the possible embodiments of the third aspect and the to-be-configured network device in any one of the fourth aspect or the possible embodiments of the fourth aspect;

the network configuration system includes the network device in any one of the fifth aspect or the possible embodiments of the fifth aspect and the to-be-configured network device in any one of the sixth aspect or the possible embodiments of the sixth aspect;

the network configuration system includes the network device in any one of the seventh aspect or the possible embodiments of the seventh aspect and the to-be-configured network device in any one of the eighth aspect or the possible embodiments of the eighth aspect; or the network configuration system includes the network device in any one of the ninth aspect or the possible embodiments of the ninth aspect and the to-be-configured network device in any one of the tenth aspect or the possible embodiments of the tenth aspect.

According to a twelfth aspect, an embodiment of this application further provides a computer storage medium, including an instruction, where when the instruction is run on a network device, the network device is enabled to perform the network configuration method in any one of the first aspect or the possible embodiments of the first aspect; or when the instruction is run on a to-be-configured network device, the to-be-configured network device is enabled to perform the network configuration method in any one of the second aspect or the possible embodiments of the second aspect.

According to a thirteenth aspect, an embodiment of this application further provides a chip. The chip stores a computer program, and the computer program is executed by a processor, to perform the network configuration method in any one of the first aspect or the possible embodiments of the first aspect, or perform the network configuration method in any one of the second aspect or the possible embodiments of the second aspect.

According to the network configuration method, the device, and the system provided in the embodiments of this application, before configuring the network device, the primary network device first obtains the configuration template file based on the type of the to-be-configured network device, where the configuration template file corresponds to a network device of a same type, the configuration template file includes the at least one configuration command, and the at least one configuration command is used to indicate the relationship between the configuration parameter of the to-be-configured network device and the configuration parameter of the another network device. The configuration command in the configuration template file indicates the relationship between the configuration parameter of the to-be-configured network device and the configuration parameter of the another network device. Therefore, the primary network device can generate the instantiated configuration data of the to-be-configured network device directly based on the configuration parameter of the to-be-configured network device and the at least one configuration command, and send the instantiated configuration data to the to-be-configured network device, so that the to-be-configured network device performs matching configuration based on the instantiated configuration data. In this case, the administrator does not need to manually generate the configuration data of each device, thereby implementing automatic configuration of the network device. This not only improves the configuration efficiency of the network device, but also improves the configuration accuracy.

BRIEF DESCRIPTION OF DRAWINGS

FIG. 3 is an example diagram of a key requirement and an implementation mechanism of a configuration template file according to an embodiment of this application;

FIG. 4 is a schematic diagram of determining a configuration command according to an embodiment of this application;

FIG. 5 is another schematic diagram of determining a configuration command according to an embodiment of this application;

DESCRIPTION OF EMBODIMENTS

A network architecture and a scenario described in embodiments of this application are intended to describe technical solutions in the embodiments of this application more clearly, and do not constitute a limitation on the technical solutions provided in the embodiments of this application. A person of ordinary skill in the art may know that, with evolution of the network architecture and emergence of a new service scenario, the technical solutions provided in the embodiments of this application are also applicable to a similar technical problem.

Figure 1:
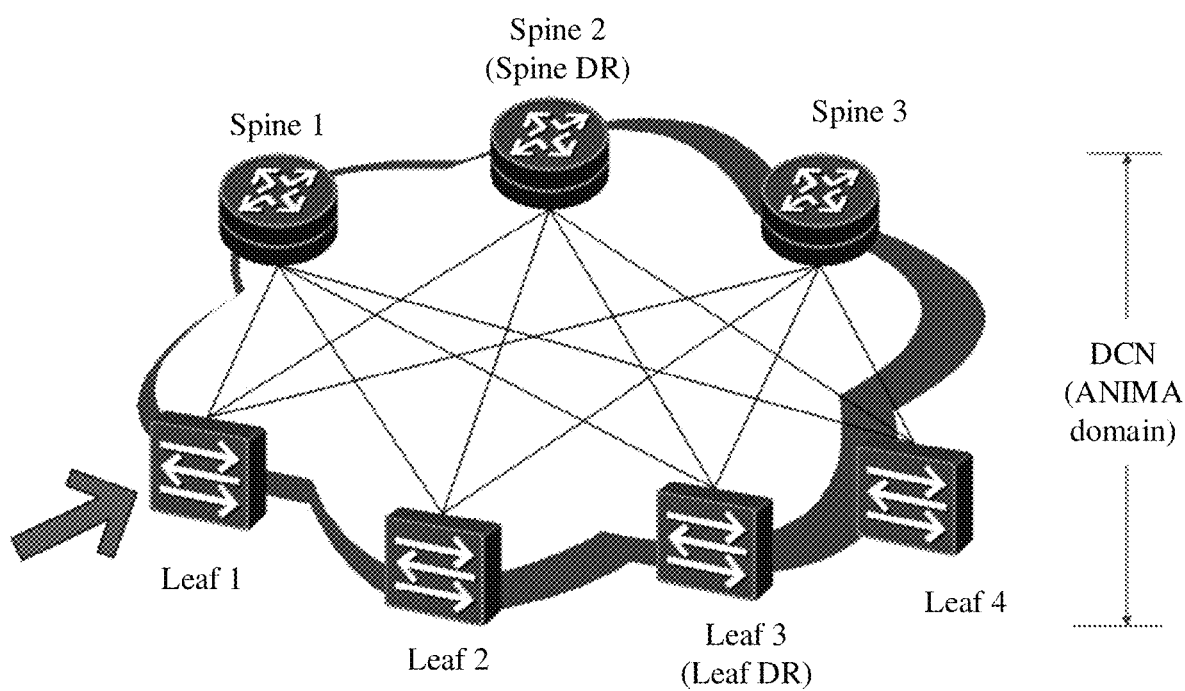
FIG. 1 is a schematic diagram of an application scenario according to an embodiment of this application.

FIG. 1 is a schematic diagram of an application scenario according to an embodiment of this application. A network configuration method provided in this application may be applied to a spine-leaf network architecture, and each network device in the spine-leaf network architecture is a device in an ANIMA domain. A two-tier spine-leaf network architecture is used as an example. The two-tier spine-leaf network architecture includes network devices of two role types, and the two role types are respectively a spine and a leaf. Certainly, the spine-leaf network architecture may alternatively be a three-tier spine-leaf network architecture. The three-tier spine-leaf network architecture includes three role types of network devices, and the three role types are respectively a spine, a border leaf, and a server leaf. The two-tier spine-leaf network architecture may include at least one spine device and at least one leaf device. Referring to FIG. 1, an example in which the spine-leaf network architecture includes three spine devices and four leaf devices is used. The three spine devices are respectively a spine device 1, a spine device 2, and a spine device 3, and the four leaf devices are respectively a leaf device 1, a leaf device 2, a leaf device 3, and a leaf device 4. Each spine device is connected to each of the four leaf devices, one (for example, the spine device 2) of the three spine devices is used as a primary network device, and one (for example, the leaf device 3) of the four leaf devices is used as a backup network device. The primary network device is mainly configured to perform instantiation configuration for all network devices in the spine-leaf network architecture. Because a network device of a same type corresponds to a same configuration template file, the primary network device needs to first obtain a corresponding configuration template file based on a type of a to-be-configured network device. It should be noted that, in this embodiment of this application, a quantity of required configuration template files is determined based on a quantity of types of network devices in the spine-leaf network architecture and which to-be-configured network devices are (for example, some network devices or all network devices).

The network device may be a device that performs a routing and forwarding function, for example, a router, a switch, or a forwarding device.

To resolve a prior-art problem that when an administrator manually generates configuration data of each device, not only configuration efficiency is low, but also an error is likely to occur during configuration, thereby resulting in low configuration accuracy, an embodiment of this application provides an automatic network configuration method, so that before a network device is configured, a primary network device first obtains a configuration template file based on a type of a to-be-configured network device. The configuration template file corresponds to a network device of a same type, the configuration template file includes at least one configuration command, and the at least one configuration command is used to indicate a relationship between a configuration parameter of the to-be-configured network device and a configuration parameter of another network device. The configuration command in the configuration template file indicates the relationship between the configuration parameter of the to-be-configured network device and the configuration parameter of the another network device. Therefore, the primary network device may generate instantiated configuration data of the to-be-configured network device directly based on the configuration parameter of the configuration network device and the at least one configuration command, and send the instantiated configuration data to the to-be-configured network device, so that the to-be-configured network device performs matching configuration based on the instantiated configuration data. In this case, the administrator does not need to manually generate the configuration data of each device, thereby implementing configuration automation. This not only improves the configuration efficiency of the network device, but also improves the configuration accuracy.

Before the technical solutions of this application are described in detail by using the embodiments, several basic concepts are first described. In the spine-leaf network architecture, there is usually one spine DR device (belonging to the spine) and one leaf DR device (belonging to the leaf). The spine DR device is determined from spine network devices based on a first preset condition. For example, the spine DR is a spine device with a "smallest" IPv6 ULA in a fabric and is equivalent to a "virtual network management system" in the fabric. Only one spine DR device exists in the fabric at any time. The spine DR device is responsible for generating instantiated configuration data for some spine devices (including the spine DR device) and/or leaf devices in the spine-leaf network architecture based on a configuration template file. The leaf DR device is determined based on a second preset condition. For example, a leaf device with the "smallest" IPv6 ULA in the fabric does not instantiate a configuration template, is used as a backup device of the spine DR, and is mainly configured to back up content of the configuration template file and content of dynamic running data in a process in which the spine DR device performs configuration, to ensure reliability of the content of the configuration template file and the content of the dynamic running data. In addition, when a device with the "smallest" IPv6 ULA in the fabric changes (an existing spine DR device/leaf DR device is faulty or a new spine device/leaf device is joined to the fabric), a switching operation needs to be performed on the spine DR device or the leaf DR device, and this operation is triggered by RPL route convergence. After switching is complete (the RPL route convergence is complete), content of a configuration template and running status data need to be backed up. Generally, all spine devices and leaf devices in a DCN have RPL host routes with a same prefix. Therefore, a spine DR device and a leaf DR device selected from all of the devices are the same. To be specific, uniqueness of a selection result can be ensured without centralized calculation. An IPv6 ULA address remains unchanged as long as a network device is still in the ANIMA domain. Therefore, the spine DR device and the leaf DR device do not change easily. In addition, data needs be synchronized between the spine DR device and the leaf DR device in real time.

An interconnection interface between a spine device and a leaf device is an inline interface. A connection interface between the spine device and an external network device and a connection interface between the leaf device and an external network device are outreach interfaces. A direct aggregated link between two devices in a multichassis link aggregation group (M-LAG) is a peer-link (a connection interface of a peer-to-peer link), and the peer-link is used to exchange a protocol packet and transmit some traffic, to ensure that the M-LAG works normally. A main function of the M-LAG is to provide access reliability for a device accessing to the fabric. Accessing to the fabric by a device mainly includes the following three operations. 1. A user device is simultaneously connected to two leaf devices, and selects a leaf device and a leaf DR device by using a virtual router redundancy protocol (VRRP). 2. The two leaf devices are connected by using one link (referred to as the peer-link), to back up running data (for example, a dynamically learned ARP entry) between the two leaf devices. 3. When one of the leaf devices or an access link is faulty, switching from the leaf device to the leaf DR device is performed, and the peer-link can also be used to forward downlink traffic.

With reference to FIG. 1, the following uses an example in which the to-be-configured network device is the leaf device 1 for description, and describes in detail, by using specific embodiments, the technical solutions of this application and how to resolve the foregoing technical problem by using the technical solutions of this application. It should be noted that, to avoid repetition, only an instantiation configuration process of the leaf device 1 that is the to-be-configured network device is used as an example for description in this embodiment of this application. An instantiation configuration process of another device is similar to the instantiation configuration process of the leaf device 1. Details are not described in this embodiment of this application. In addition, the following several specific embodiments may be combined with each other, and a same or similar concept or process is not described in some embodiments.

Figure 2:
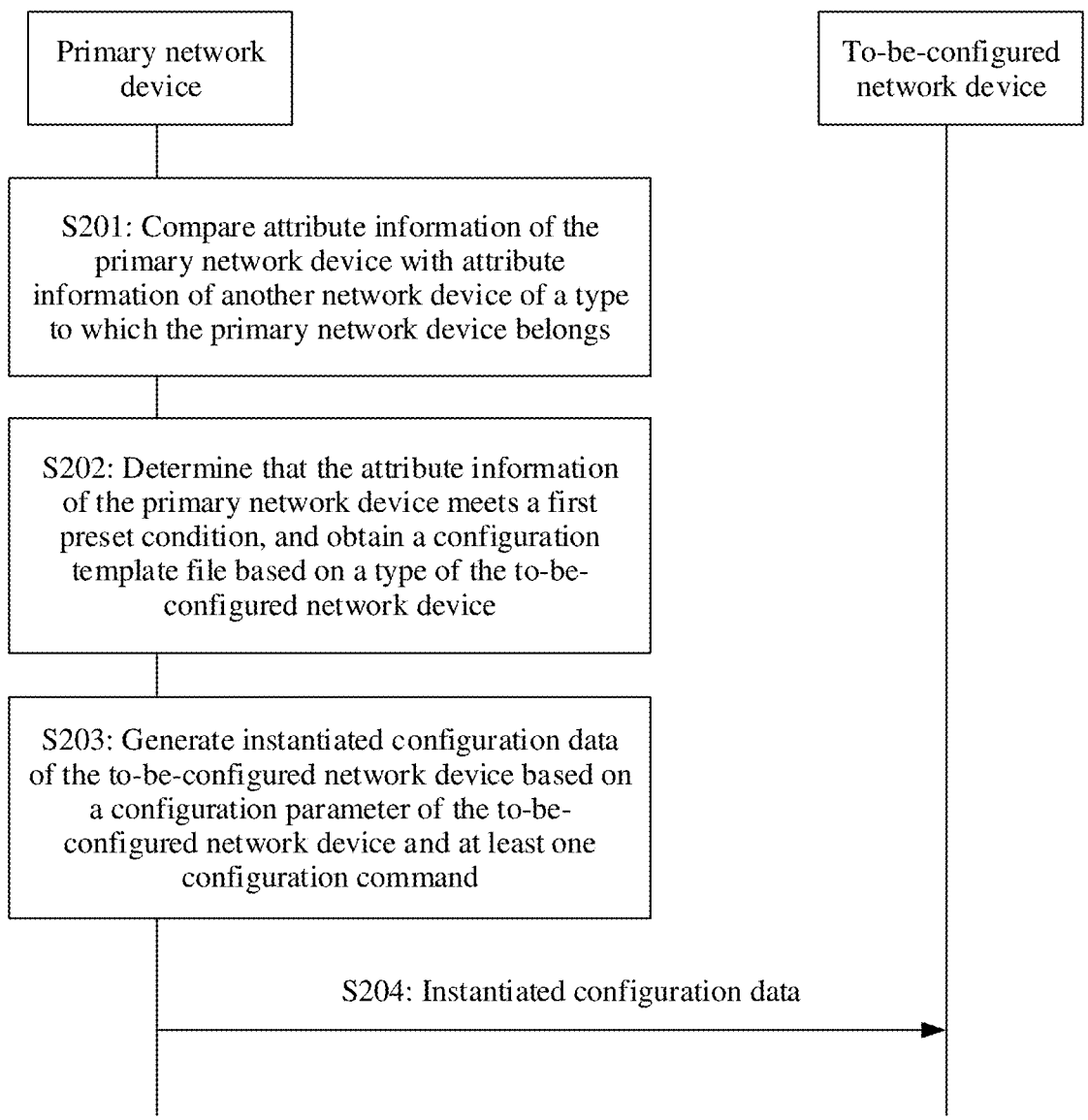
FIG. 2 is a schematic flowchart of a network communication method according to an embodiment of this application.

FIG. 2 is a schematic flowchart of a network configuration method according to an embodiment of this application. Referring to FIG. 2, the network configuration method may include the following operations.

S201: A primary network device compares attribute information of the primary network device with attribute information of another network device of a type to which the primary network device belongs.

The primary network device is a spine DR device, and is mainly configured to perform instantiation configuration on some other devices or all network devices in a spine-leaf network architecture. The spine DR device belongs to a spine. When determining a type of each network device, the network device may be classified based on a role of the device, to determine a role type of the network device.

After each network device in the spine-leaf network architecture is started and joined to an ANIMA domain, an ANIMA function is enabled on an inline interface between a spine device and a leaf device. In an embodiment, if a peer-link is deployed between a spine device and a spine device, or a peer-link is deployed between a leaf device and a leaf device, the ANIMA function is also enabled on a peer-link interface. In addition, all spine devices or leaf devices in the ANIMA domain maintain one RPL host routing table with a same prefix list. An online/offline status of all of the spine devices or the leaf devices in a fabric may be obtained by using the table. Each spine device or leaf device can use an IPv6 ULA address as a unique identifier in the fabric. Before a to-be-configured network device is configured, each network device in spine devices in the spine-leaf network architecture needs to first determine whether the network device is a spine DR device. Because each network device in the ANIMA domain has full connectivity, an RPL (or an alternate routing protocol of the RPL) is generally used to implement the full connectivity. However, the RPL may further advertise a route (for example, a network segment route of an NMS host in a plug-and-play scenario) from another source. Therefore, an RPL host route cannot be simply used as a device identifier. Instead, the RPL host route should simultaneously meet the following conditions. 1. The RPL host route is a /128 host route. 2. The RPL host route is located in a same ANIMA domain (has a same /48 prefix), uses an ACP zone addressing sub-scheme, and V is equal to 0. In this way, each network device in the ANIMA domain may access another network device in the ANIMA domain, to obtain a type and attribute information of the another network device, so as to determine, based on the attribute information of each network device, whether the network device is the spine DR device. For example, the attribute information may be address information, to determine the type and the address information of each network device.

For example, with reference to FIG. 1, an example in which the spine device 2 is the primary network device is used. After obtaining a type and address information of each network device in the network, the spine device 2 may determine that both the spine device 1 and the spine device 3 are spine devices, and then, separately compare attribute information of the spine device 2 with attribute information of the spine device 1 and attribute information of the spine device 3. For example, when the attribute information is address information, the spine device 2 separately compares address information of the spine device 2 with address information of the spine device 1 and address information of the spine device 3, to determine whether the spine device 2 is used as the primary network device.

S202: The primary network device determines that the attribute information of the primary network device meets a first preset condition, and obtains a configuration template file based on a type of the to-be-configured network device.

The first preset condition may be understood as that attribute information of a primary network device in the spine devices is the largest or the smallest. For example, when the attribute information is address information, because the IPv6 ULA address of each network device in the ANIMA is unique and fixed, that the address information in the spine devices is the smallest may be used as the first preset condition. Certainly, that the address information in the spine devices is the largest may alternatively be used as the first preset condition. For example, in this embodiment of this application, the first preset condition is that the address information in the spine devices is the smallest.

When it is determined whether the attribute information of the primary network device meets the first preset condition, both the primary network device and another network device in the spine need to compare respective IPv6 ULA address information of the primary network device and the another network device with IPv6 ULA address information of another spine device in the spine. If the IPv6 ULA address information of the primary network device is the smallest, it is determined that the primary network device is a primary network device configured to perform instantiation configuration, namely, the spine DR device. After the primary network device is determined as the primary network device, as the primary network device, the primary network device is mainly configured to generate instantiated configuration data for some spine devices (including the primary network device) and/or leaf devices in the spine-leaf network architecture based on the configuration template file. Before the instantiated configuration data is generated, the corresponding configuration template file needs to be obtained first based on the type of the to-be-configured network device, to generate instantiated configuration data of the to-be-configured network device based on the configuration template file. To be specific, the configuration template file can be obtained based on the type of the to-be-configured network device only after it is determined that the primary network device is the primary network device.

In an embodiment, there may be one or more configuration template files, and the configuration template file may be specifically configured based on an actual requirement. For example, a network device of a same type corresponds to a same configuration template file. Therefore, when all to-be-configured network devices are spine devices or leaf devices, correspondingly, only a configuration template file corresponding to the spine devices or a configuration template file corresponding to the leaf devices can be obtained. When the to-be-configured network devices include a spine device and a leaf device, two configuration template files may be used, where one configuration template file is used to generate instantiated configuration data for the spine device, and the other configuration template file is used to generate instantiated configuration data for the leaf device. For example, in this embodiment of this application, for example, if the to-be-configured network device is a leaf device, there is one corresponding configuration template file. It should be noted that the configuration template file in this embodiment of this application is a configuration template file that is represented in an XML file format and that is based on a device role type, and the configuration template file is generated through offline editing. The configuration template file may be edited manually or by using a related UI tool. When the configuration template file is generated, the configuration template is edited offline at a time. Configuration data of an underlay network architecture may be automatically generated online for any quantity of spine devices and/or leaf devices, so that the generated configuration data is highly consistent. This further improves deployment efficiency of a DCN network. It should be noted that the configuration template in this embodiment of this application supports processing of M-LAG configuration.

Further, the configuration template file actually "parameterizes" configuration data (mainly for the underlay network architecture) of command lines of a same device role type in the fabric. FIG. 3 is an example diagram of a key requirement and an implementation mechanism of a configuration template file according to an embodiment of this application. 1. A configuration file is templatized/parameterized. This requirement may be implemented by defining a macro and parameterizing a command line. 2. Same configuration parameters need to be allocated in a unified manner in a DCN to avoid a conflict. This requirement may be implemented by performing configuration parameter resource pooling and using the macro to allocate and reference a resource value. 3. A parameter of a configuration command needs to reflect a final status, and is irrelevant to an operation timing. This requirement may be implemented by delaying instantiation and canceling timing dependency. 4. Automatically generating configuration data according to a rule needs to be supported and the configuration data is updated accordingly. This requirement may be implemented by using a well-known macro or a pre-defined target object set, or by instantiating a requirement and selecting a command set based on a deployment/installation status. Alternatively, this requirement may be implemented by performing instantiation repeatedly to support generation of the configuration data based on a type instead of an instance, or by delaying instantiation to sense capacity expansion of the target object set, and dynamically update the configuration data. 5. Calculating and generating a paired configuration command on a related device according to a peer relationship needs to be supported, and the is paired configuration command updated accordingly. This requirement may be implemented by defining a peer relationship by using a peer group (which is used to define a peer relationship between a plurality of devices (a spine device and a spine device, a spine device and a leaf device, or a leaf device and a leaf device). In an embodiment, after instantiation configuration, and before the instantiated configuration data is actually loaded, the instantiated configuration data further needs to be submitted to an administrator to confirm content of the instantiated configuration data, to avoid an error in the generated instantiated configuration data. This may be specifically implemented by using a dry-run mechanism.

The macro is used to implement template-based configuration a command line, and instantiation of the macro is to implement/expand a macro definition by using a specific value. For example, in this embodiment of this application, types of the macro may include at least the following six types:

1. The well-known macro is a predefined macro, and this type of macro may be used for some configuration data related to device installation and deployment information (for example, a name list of an inline interface on the spine or the leaf or a name list of an interface added to a peer-link). The well-known macro does not need to be defined and cannot be defined (repeatedly) in a configuration template, and may be directly used as a command line parameter.

2. A simple macro means that a value is used to replace a macro name during instantiation.

3. A resource macro means that, during each instantiation, a new value needs be allocated from a specified resource pool, and it needs to be ensured that the newly allocated value is unique in a specified range.

4. A negotiation macro is a resource macro allocated through negotiation, and is a special resource macro because resource allocation needs meet some constraints (for example, IP addresses configured on a directly connected interface of two devices need be on a same network segment), and a related resource is not simply allocated from a resource pool by a spine DR, but these constraints can be met only through negotiation between the devices. During resource allocation, a negotiation process exists between the devices. Therefore, when the negotiation macro is defined, a target object of a negotiation operation needs to be specified.

5. A reference macro means that a macro references specified parameters of other commands in a same device configuration file. The referenced parameter needs be a macro. To avoid cyclic dependency, that the referenced parameter can only be a simple macro or a resource macro is currently limited. It should be noted that, for the reference macro, a case "reference before definition" may occur. This case needs to be supported during implementation. The reference macro is actually an alias (alias) of the simple macro and the resource macro. An advantage of using the reference macro is that semantics is clearer and a plurality of times of allocation of resources can be avoided when the resource macro is referenced for a plurality of times.

6. A set macro (set macro) is used to collect newly allocated resource values (which may be derived from a plurality of macros, but these macros need to have a same data type) when a spine DR calculates configuration data, and dynamically create a resource macro to facilitate an operation. For example, for a configuration command "a network command of OSPF is used to advertise network segment routes of all inline interfaces on a current device", a plurality of devices may share a same resource pool. Therefore, a list of IP addresses allocated to the inline interfaces on the current device cannot be obtained by traversing the resource pool. This problem can be solved by using the set macro. The set macro is defined by a set property in a <macro set="set_macro_name"> tag.

Each configuration template file includes at least one configuration command, where the configuration command is used to indicate a relationship between a configuration parameter of the to-be-configured network device and a configuration parameter of another network device, and the configuration command may be used to select different command sets based on hardware installation or another condition of the to-be-configured network device, thereby implementing automatic configuration. Certainly, the configuration template file may alternatively include another command, for example, a command used to indicate resource allocation. For example, FIG. 4 is a schematic diagram of determining a configuration command according to an embodiment of this application. The configuration command is used to determine different command sets based on a type of a board installed on a device. Certainly, the configuration command may alternatively be determined based on a product form. FIG. 5 is another schematic diagram of determining a configuration command according to an embodiment of this application. In this embodiment of this application, a configuration template file is obtained in advance, and the configuration template file corresponds to a network device of a type. In addition, when instantiated configuration data of each to-be-configured network device is generated based on the configuration template file, a configuration command in the configuration template file indicates a relationship between a configuration parameter of the to-be-configured network device and a configuration parameter of another network device. Therefore, a primary network device may automatically generate the instantiated configuration data of the to-be-configured network device directly based on the configuration parameter of the configuration network device and at least one configuration command. In this case, an administrator does not need to manually generate configuration data of each device. This not only improves configuration efficiency of a network device, but also improves configuration accuracy.

In an embodiment, when obtaining the configuration template file based on the type of the to-be-configured network device, the primary network device may receive at least one configuration template file sent by a second network device, where the second network device is any network device in the network; and determine the configuration template file in the at least one configuration template file based on the type of the to-be-configured network device.

It should be noted that the second network device may be used as an injection network device, and may be any network device in the fabric. Certainly, the second network device may alternatively be the primary network device. After the at least one configuration template file is generated through offline editing, the administrator may send the generated at least one configuration template file to any optional second network device in the spine-leaf network architecture through an OM interface by using a universal file transfer protocol (for example, a trivial file transfer protocol (TFTP) or a file transfer protocol (FTP)). The second network device is used as an injection network device, and sends the at least one configuration template file received by the second network device to the primary network device by using a file transfer protocol (the universal file transfer protocol such as the TFTP/FTP, or a file transfer mechanism based on a general responsibility assignment software pattern (GRASP)), so that the primary network device can generate the instantiated configuration data of the to-be-configured network device based on the configuration parameter of the to-be-configured network device and the at least one configuration command in the configuration template file. The administrator does not need to determine the primary network device based on an attribute of each network device, but randomly sends the at least one configuration template file to the second network device. Then, the second network device sends the at least one configuration template file to the primary network device. This reduces operation complexity of the administrator.

Similarly, with reference to FIG. 1, when it is determined whether the spine device 2 meets the first preset condition, when the IPv6 ULA address information of the spine device 2 is greater than one of the address information of the spine device 1 and the address information of the spine device 3 or is greater than the address information of both the spine device 1 and the address information of the spine device 3, it is determined that the spine device 2 is not the primary network device. After receiving a configuration template file sent by an injection network device, the spine device 2 refuses to receive the configuration template file. On the contrary, if determining that the IPv6 ULA address information of the spine device 2 is less than the address information of the spine device 1 and the address information of the spine device 3, the spine device 2 determines that the spine device 2 is the primary network device, receives a configuration template file sent by an injection network device (for example, the injection network device may be a leaf device), obtains at least one configuration command in the configuration template file, and performs the following S203.

S203: The primary network device generates the instantiated configuration data of the to-be-configured network device based on the configuration parameter of the to-be-configured network device and the at least one configuration command.

In an embodiment, the at least one configuration command includes a first configuration command, and S203 in which the primary network device generates the instantiated configuration data of the to-be-configured network device based on the configuration parameter of the to-be-configured network device and the at least one configuration command may include:

obtaining, by the primary network device, a parameter of a first network device based on the first configuration command, where the first configuration command is used to indicate a relationship between the configuration parameter of the to-be-configured network device and the parameter of the first network device; and when the primary network device obtains the parameter of the first network device, generating, by the primary network device, the instantiated configuration data of the to-be-configured network device based on the configuration parameter of the to-be-configured network device, the first configuration command, and the parameter of the first network device. It should be noted that, when the configuration template file further includes a resource allocation command, and the primary network device may directly obtain the parameter of the first network device, the primary network device allocates a resource to the to-be-configured network device, and generates the instantiated configuration data. The instantiated configuration data includes resource data allocated to the to-be-configured network device, where the resource data is resource data generated in a process in which the to-be-configured network generates the instantiated configuration data. It can be learned that when the primary network device can obtain the parameter of the first network device, the primary network device can generate the instantiated configuration data of the to-be-configured network device directly based on the configuration parameter of the to-be-configured network device, the first configuration command, and the parameter of the first network device. This helps further improve efficiency of automatic configuration. For example, in this embodiment of this application, the resource data may be IPv6 ULA address information. In an embodiment, when all parameters of the first network device are associated with parameters of the to-be-configured network device, the parameters of the first network device are all of the parameters of the first network device. When some parameters of the first network device are associated with the parameters of the to-be-configured network device, the parameters of the first network device are some parameters that are of the first network device and that are associated with the parameters of the to-be-configured network device.

In addition, when the primary network device generates the instantiated configuration data for the to-be-configured network device, not all leaf devices have gone online and generated configurations before. Therefore, the primary network device cannot automatically generate configuration commands for the devices of this type in a timely manner. To be specific, in this case, if the primary network device cannot obtain the parameter of the first network device, the primary network device sends the configuration parameter of the to-be-configured network device and the first configuration command to the to-be-configured network device, so that the to-be-configured network device generates the instantiated configuration data based on the configuration parameter of the to-be-configured network device and the first configuration command, and performs configuration based on the instantiated configuration data. It can be learned that when the primary network device cannot obtain the parameter of the first network device and cannot generate the instantiated configuration data of the to-be-configured network device, the primary network device may send the configuration parameter of the to-be-configured network device and the first configuration command to the to-be-configured network, so that the to-be-configured network device generates the instantiated configuration data based on the configuration parameter of the to-be-configured network device and the first configuration command. This avoids a case in which configuration cannot be performed, and helps further improve reliability of automatic configuration. It should be noted that, when the configuration template file further includes the resource allocation command, in this scenario, the to-be-configured network device allocates the resource for the to-be-configured network device and generates the instantiated configuration data, where the instantiated configuration data includes the resource data allocated to the to-be-configured network device. In addition, to reduce complexity of the primary network device, the to-be-configured network device does not need to send all generated instantiated configuration data to the primary network device, but can send only the resource data in the instantiated configuration data to the primary network device, so that the primary network device can obtain the resource data allocated to the to-be-configured network device.

With reference to FIG. 1, an example in which the to-be-configured network device is the leaf device 1 is used for description. After the primary network device obtains a configuration template file corresponding to a type of two leaf devices, if the configuration template file includes two configuration commands, where the first configuration command is used to indicate an association relationship between a configuration parameter of the leaf device 1 and some parameters of the leaf device 2, and the second configuration command is used to indicate an association relationship between the configuration parameter of the leaf device 1 and some parameters of the leaf device 4, the primary network device may obtain instantiated configuration data of the leaf device 1 based on the configuration parameter of the leaf device 1, the first configuration command, and the second configuration command.

Before the instantiated configuration data of the leaf device 1 is generated based on the configuration parameter of the leaf device 1, the first configuration command, and the second configuration command, respective parameters of the leaf device 2 and the leaf device 4 need to be first obtained based on the first configuration command and the second configuration command. When the respective parameters of the leaf device 2 and the leaf device 4 are obtained, the primary network device can generate the instantiated configuration data of the leaf device 1 directly based on the configuration parameter of the leaf device 1, the first configuration command, the second configuration command, and the respective parameters of the leaf device 2 and the leaf device 4. On the contrary, when the parameters of the leaf device 2 and/or the leaf device 4 cannot be obtained, the primary network device may send the configuration parameter of the leaf device 1, the first configuration command, and the second configuration command to the leaf device 1, so that the leaf device 1 separately negotiates with the leaf device 2 and the leaf device 4 to determine the respective parameters of the leaf device 2 and the leaf device 4, and generates the instantiated configuration data of the leaf device 1 based on the configuration parameter of the leaf device 1, the first configuration command, the second configuration command, and the respective parameters of the leaf device 2 and the leaf device 4.

S204: The primary network device sends the instantiated configuration data to the to-be-configured network device.

The instantiated configuration data is used to instruct the to-be-configured network device to perform configuration based on the instantiated configuration data.

After the primary network device generates the instantiated configuration data of the to-be-configured network device based on the configuration parameter of the to-be-configured network device and the at least one configuration command in S203, the primary network device may send the generated instantiated configuration data to the to-be-configured network device, so that the to-be-configured network device performs configuration based on the instantiated configuration data. Specifically, the to-be-configured network device performs instantiation configuration. If instantiation does not need to be delayed, the to-be-configured network device may directly load and validate the instantiated configuration data. If instantiation needs to be delayed for some/a small quantity of configuration commands, instantiation is delayed. If instantiation is partially completed and a default value exists for an uncompleted part, the default value is used. If instantiation is partially completed and the default value does not exist for the uncompleted part, an error is returned. If no error occurs, the data is not loaded temporarily. Then, a resource allocation result in an instantiation configuration process is returned to the primary network device.

With reference to FIG. 1, after generating the instantiated configuration data of the leaf device 1, the spine device 2 may send the instantiated configuration data to the leaf device 1, so that the leaf device 1 performs configuration based on the instantiated configuration data after receiving the instantiated configuration data. It can be learned that according to the network configuration method provided in this embodiment of this application, when the to-be-configured network device is configured, because the configuration command in the configuration template file indicates the relationship between the configuration parameter of the to-be-configured network device and the configuration parameter of the another network device, the primary network device can automatically obtain the instantiated configuration data of the to-be-configured network device directly based on the configuration parameter of the configuration network device and the at least one configuration command. In this case, the administrator does not need to manually generate configuration data of each device. This not only improves configuration efficiency of a network device, but also improves configuration accuracy.

According to the network configuration method provided in this embodiment of this application, before configuring the network device, the primary network device first obtains the configuration template file based on the type of the to-be-configured network device, where the configuration template file corresponds to a network device of a same type, the configuration template file includes the at least one configuration command, and the at least one configuration command is used to indicate the relationship between the configuration parameter of the to-be-configured network device and the configuration parameter of the another network device. The configuration command in the configuration template file indicates the relationship between the configuration parameter of the to-be-configured network device and the configuration parameter of the another network device. Therefore, the primary network device can generate the instantiated configuration data of the to-be-configured network device directly based on the configuration parameter of the configuration network device and the at least one configuration command, and send the instantiated configuration data to the to-be-configured network device, so that the to-be-configured network device performs matching configuration based on the instantiated configuration data. In this case, the administrator does not need to manually generate the configuration data of each device, thereby implementing configuration automation. This not only improves the configuration efficiency of the network device, but also improves the configuration accuracy.

Figure 6:
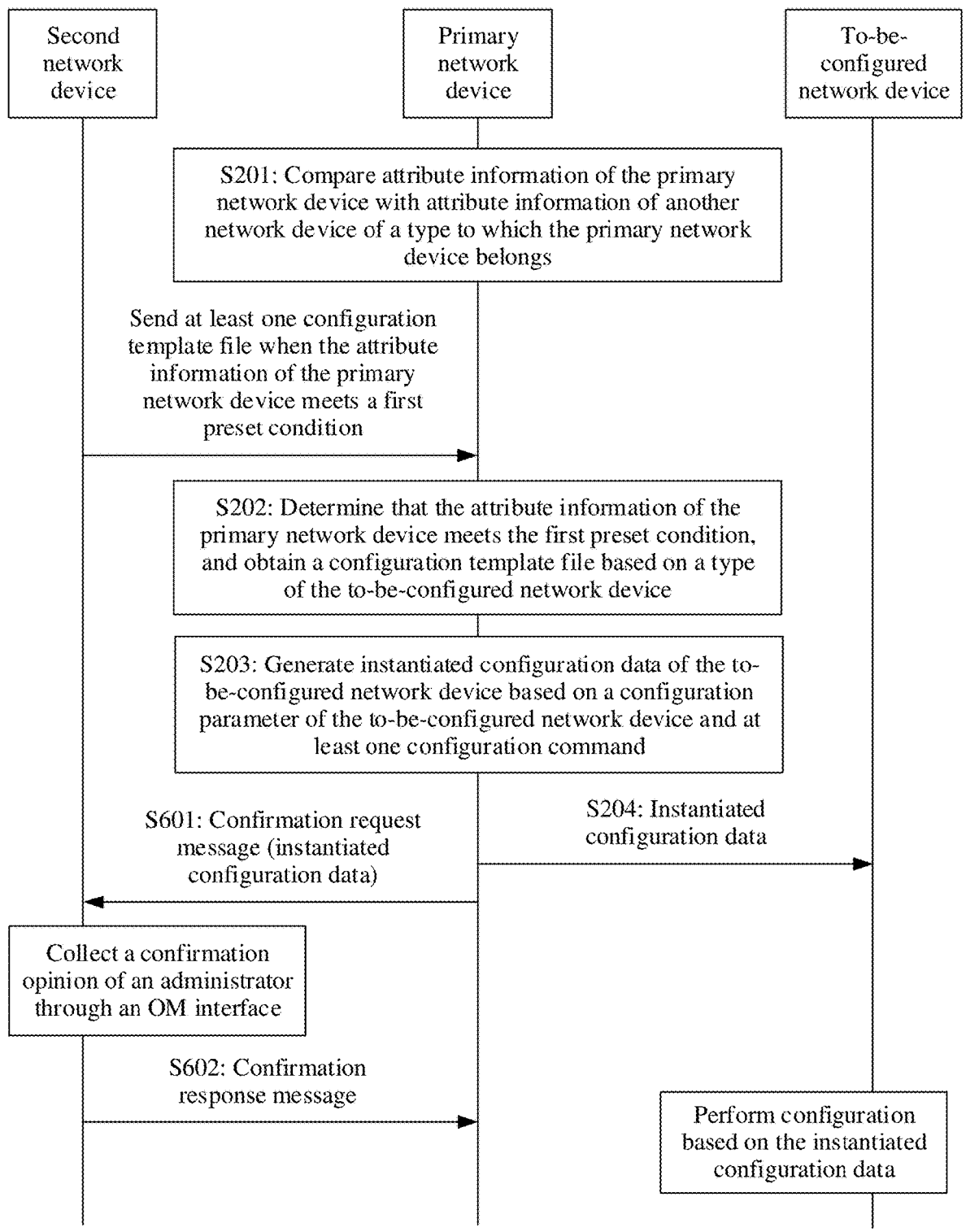
FIG. 6 is a schematic flowchart of another network configuration method according to an embodiment of this application.

Based on the embodiment shown in FIG. 2, to avoid a problem caused by incorrect content of the instantiated configuration data during loading, optionally, after the primary network device sends the instantiated configuration data to the to-be-configured network device in S204 and before the to-be-configured network device actually loads the instantiated configuration data, the dry-run mechanism may be used to enable the administrator to check the instantiated configuration data, to ensure that the generated instantiated configuration data is correct. For example, FIG. 6 is a schematic flowchart of another network configuration method according to an embodiment of this application.

S601: The primary network device sends a confirmation request message.

The confirmation request message includes the instantiated configuration data, and the confirmation request message is used to request to confirm the instantiated configuration data.

After the primary network device (the spine device 2) sends the instantiated configuration data to the to-be-configured network device and before the to-be-configured network device actually loads the instantiated configuration data, to avoid the problem caused by the incorrect content of the instantiated configuration data during loading, the to-be-configured network device first does not load the instantiated configuration data, and the primary network device sends the confirmation request message to the injection network device (the leaf device 1) or the administrator, where the confirmation request message includes the generated instantiated configuration data, where the confirmation request message includes the generated instantiated configuration data, to confirm the generated instantiated configuration data by the injection network device or the administrator. For example, after receiving the confirmation request message sent by the primary network device, the injection network device may collect a confirmation opinion of the administrator through the OM interface, and return a confirmation result to the primary network device.

Certainly, the primary network device may not send the confirmation request message, but in a process of generating the instantiated configuration data, the injection network device or the administrator may synchronously obtain the instantiated configuration data, so that the injection network device or the administrator confirms the generated instantiated configuration data.

S602: The primary network device receives a confirmation response message.

The confirmation response message is used to indicate that the instantiated configuration data is correct.

If the primary network device receives the confirmation response message, it indicates that the instantiated configuration data is correct after being verified, and then the to-be-configured network device performs loading and validation based on the instantiated configuration data. On the contrary, if the primary network device receives a confirmation reject message, it indicates that the instantiated configuration data is incorrect or the instantiated configuration data does not meet a new instantiation configuration requirement, and the primary network device clears related data by using the to-be-configured network device, and locally releases a related resource.

It can be learned that in this embodiment of this application, after the primary network device sends the generated instantiated configuration data to the to-be-configured network device and before the to-be-configured network device actually loads the instantiated configuration data, the injection network device or the administrator confirms the instantiated configuration data. In this way, the problem caused by the incorrect content of the instantiated configuration data during loading can be avoided. In addition, the administrator may also review network deployment again, to ensure that the instantiated configuration data received by the to-be-configured network device is correct. This further improves correctness and accuracy of configuration of the to-be-configured network device.

Figure 7A:
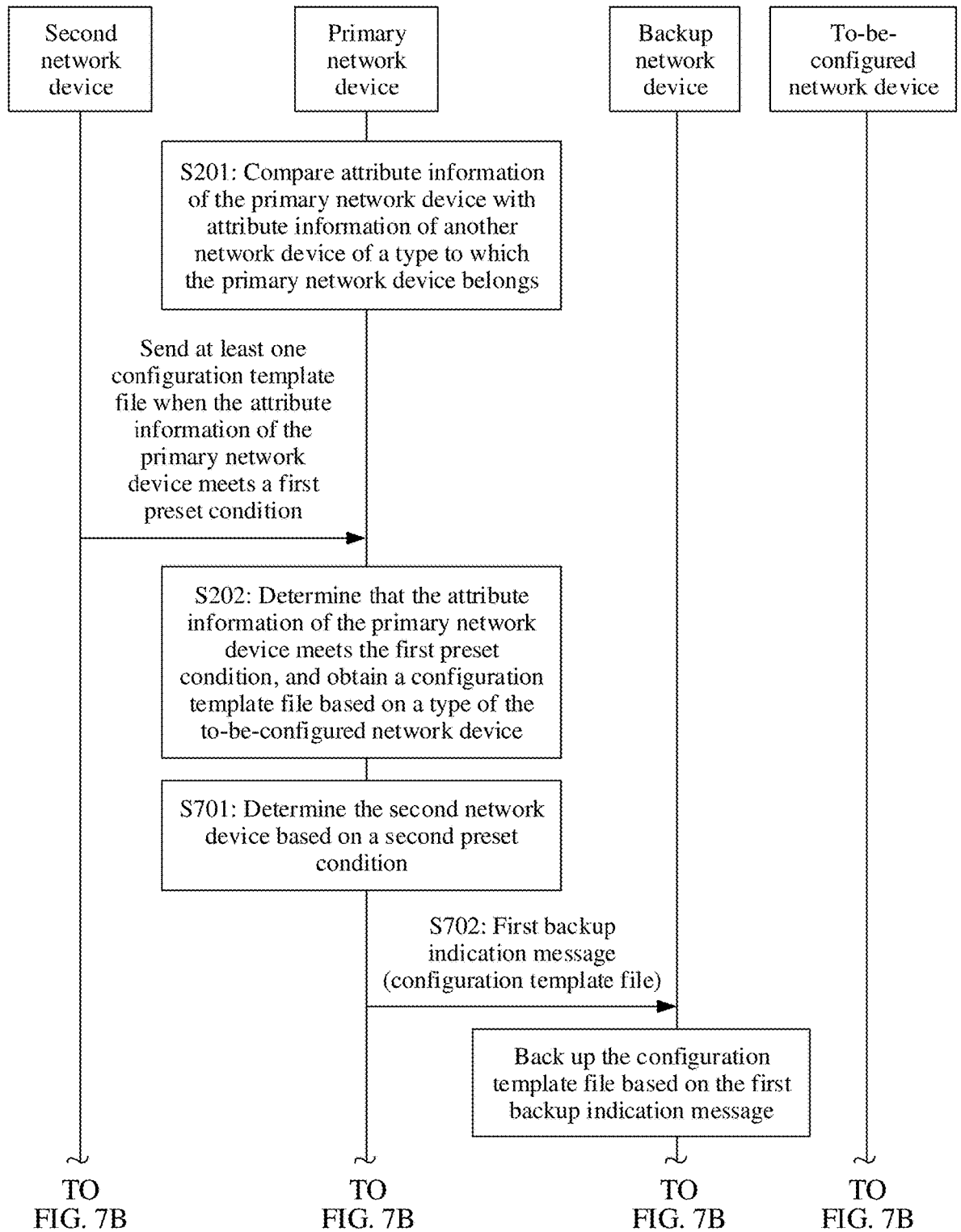
FIG. 7A and FIG. 7B are a schematic flowchart of still another network configuration method according to an embodiment of this application.
Figure 7B:
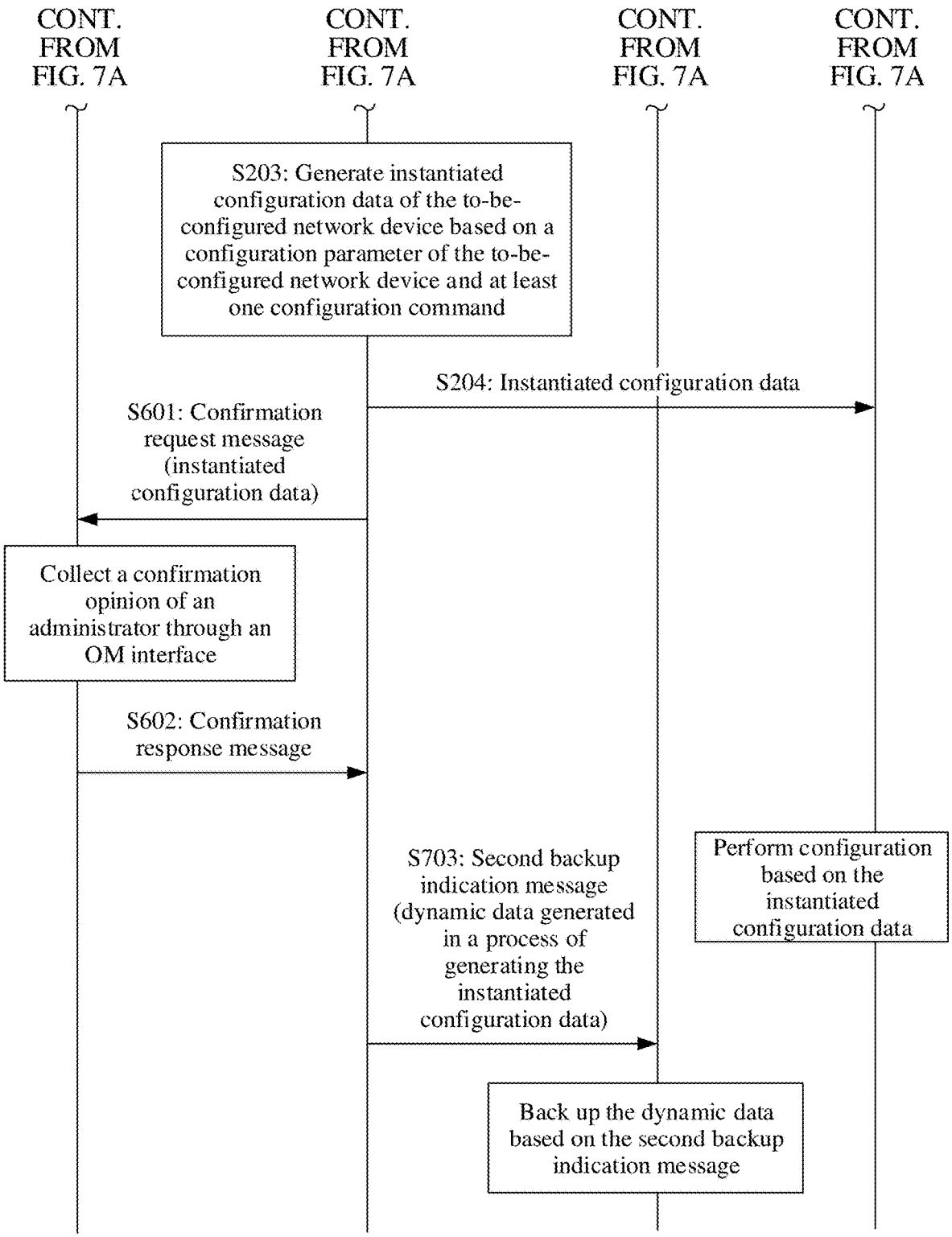

Based on the embodiment shown in FIG. 2 or FIG. 6, to ensure that a new primary network device can still obtain the configuration template file when the primary network device is switched due to a fault or the like, optionally, after the primary network device obtains the configuration template file in S201, the primary network device may first select a leaf device as a backup network device, to back up the configuration template file by using the backup network device. For example, FIG. 7A and FIG. 7B are a schematic flowchart of still another network configuration method according to an embodiment of this application.

S701: The primary network device determines the backup network device based on a second preset condition.

The second preset condition may be understood as that attribute information of a network device in leaf devices is the largest or the smallest. For example, when the attribute information is address information, because the IPv6 ULA address of each network device in the ANIMA is unique and fixed, that the address information in the leaf devices is the smallest may be used as the second preset condition. Certainly, that the address information in the leaf devices may alternatively be used as the second preset condition. For example, in this embodiment of this application, the second preset condition is that the address information in the leaf devices is the smallest. A type of the backup network device is different from the type of the primary network device, to be specific, the type of the backup network device used for backup is one of the leaf devices, and the backup network device is a network device that does not configure the instantiated configuration data.

After the primary network device obtains the configuration template file in S202, to back up the configuration template file by using the backup network device, the primary network device needs to first obtain an IPv6 ULA address of each leaf device in the leaf devices, and compare the IPv6 ULA addresses of the leaf devices. If the IPv6 ULA address of the backup network device is the smallest, the primary network device determines the backup network device as the network device used for backup.

Similarly, with reference to FIG. 1, after obtaining the type and the address information of each network device in the network, the spine device 2 may determine that the leaf device 1, the leaf device 2, the leaf device 3, and the leaf device 4 are all leaf devices, and compare address information of the leaf device 1, address information of the leaf device 2, address information of the leaf device 3, and address information of the leaf device 4, to determine which leaf device is the backup network device used for backup, namely, a leaf DR device. After comparison, if an IPv6 ULA address of the leaf device 3 is less than the address information of the leaf device 1, the address information of the leaf device 2, and the address information of the leaf device 4, it is determined that the leaf device 3 is the backup network device.

S702: The primary network device sends a first backup indication message to the backup network device.

The first backup indication message includes the configuration template file, and the first backup indication message is used to indicate the backup network device to back up the configuration template file.

After determining, based on the IPv6 ULA address of each leaf device, that the leaf device 3 is the backup network device, the primary network device sends the first backup indication message that includes the configuration template file to the leaf device 3 by using the file transfer protocol (the universal file transfer protocol such as the TFTP/FTP) or the file transfer mechanism of the GRASP. Correspondingly, after receiving the first backup indication message, the leaf device 3 also compares the IPv6 ULA address of the leaf device 3 with an IPv6 ULA address of the leaf device 1, an IPv6 ULA address of the leaf device 2, and an IPv6 ULA address of the leaf device 4 separately, to determine whether the leaf device 3 is the backup network device used for backup. After comparison, if the leaf device 3 determines that the IPv6 ULA address of the leaf device 3 is greater than one piece of address information or more pieces of address information of the IPv6 ULA address of the leaf device 1, the IPv6 ULA address of the leaf device 2, and the IPv6 ULA address of the leaf device 4, the leaf device 3 determines that the leaf device 3 is not the backup network device used for backup. In this case, the leaf device 3 refuses to receive the first backup indication message. On the contrary, if the leaf device 3 determines that the IPv6 ULA address of the leaf device 3 is less than the address information of the leaf device 1, the address information of the leaf device 2, and the address information of the leaf device 4, the leaf device 3 determines that the leaf device 3 is the backup network device. In this case, the leaf device 3 receives the first backup indication message that includes the configuration template file and that is sent by the primary network device, and backs up the configuration template file. This can prevent the configuration template file from being lost, thereby improving security of the configuration template file.

Further, after the primary network device sends the instantiated configuration data to the to-be-configured network device in S204, the following operation is further included.

S703: Send a second backup indication message to the backup network device.

The second backup indication message includes dynamic data generated in the process of generating the instantiated configuration data, and the second backup indication message is used to indicate the backup network device to back up the dynamic data.

In the process of generating the instantiated configuration data, the primary network device may generate the dynamic data (for example, allocate an address from an address pool as an interface IP address of the device). To allocate the dynamic data, after the primary network device sends the instantiated configuration data to the to-be-configured network device in S204, the primary network device may further send the second backup indication message to the backup network device (namely, the leaf device 3) used for backup, where the second backup indication message includes the dynamic data generated in the process of generating the instantiated configuration data, so that the dynamic data is backed up by using the second backup indication message. This prevents the dynamic data from being lost, thereby improving security of the dynamic data.

Figure 8:
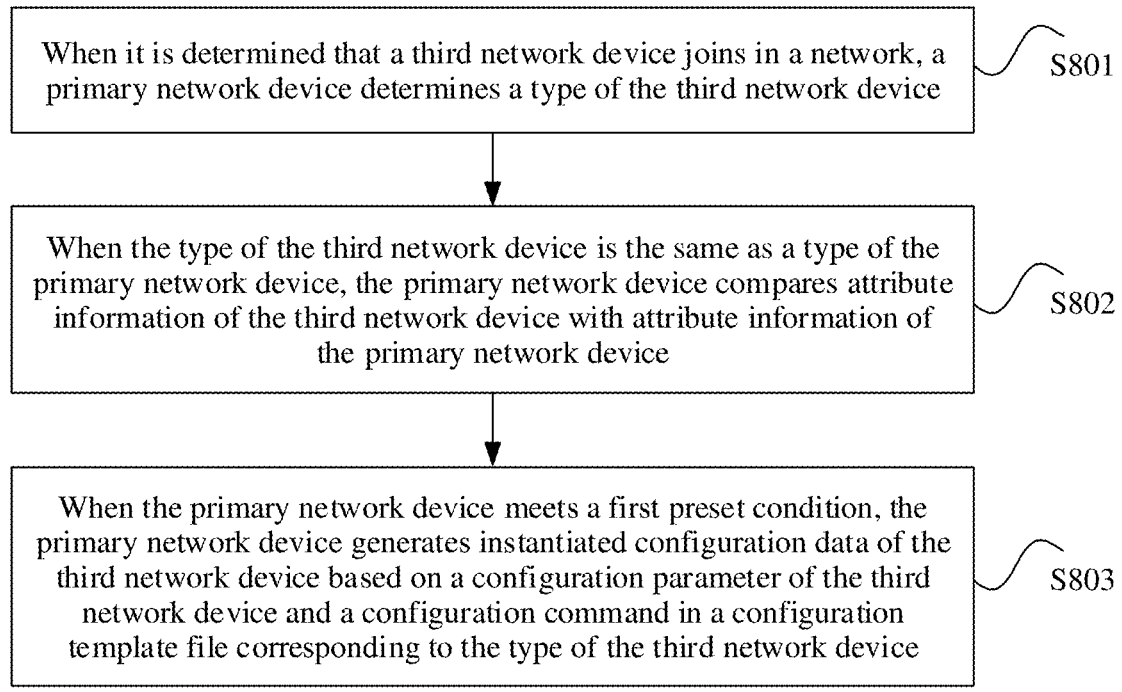
FIG. 8 is a schematic diagram of a network configuration method according to an embodiment of this application.

Based on the embodiment shown in FIG. 2, FIG. 6, or FIG. 7A and FIG. 7B, in the instantiation configuration process, if a new network device is joined, the primary network device needs to determine whether to perform instantiation configuration on the newly joined network device. For example, FIG. 8 is a schematic diagram of a network configuration method according to an embodiment of this application.

S801: When determining that a third network device joins in the network, the primary network device determines a type of the third network device.

In an embodiment, in this embodiment of this application, the primary network device may learn an RPL route in a manner of synchronously carrying or adding a separate procedure when an RPL advertises the route, and actively obtain the information by using a GRASP message. Specifically, if a new host route is added to the RPL route, it indicates that a new network device is joined to the network, and once the new network device is joined to the ANIMA domain, an IPv6 ULA address corresponding to the new network device is always stable. On the contrary, if the RPL route withdraws a host route, it indicates that a network device in the network goes offline.

With reference to FIG. 1, when the spine device 2 discovers that a new host route is added to the RPL route, it indicates that a new network device (the third network device) is joined to the network. In this case, the spine device 2 needs to first determine the type of the third network device, to be specific, whether the third network device belongs to the spine device or the leaf device.

S802: When the type of the third network device is the same as the type of the primary network device, the primary network device compares attribute information of the third network device with the attribute information of the primary network device.

When the spine device 2 determines that the third network device belongs to the spine device, it indicates that the type of the third network device is the same as the type of the primary network device. In this case, the spine device 2 needs to further compare address information of the third network device with address information of the primary network device, to determine whether spine DR device needs to be switched.

S803: When the primary network device meets the first preset condition, the primary network device generates instantiated configuration data of the third network device based on a configuration parameter of the third network device and a configuration command in a configuration template file corresponding to the type of the third network device.

When an IPv6 ULA address of the spine device 2 is less than an IPv6 ULA address of the third network device, it indicates that the IPv6 ULA address of the spine device 2 is still the smallest. In this case, it is determined that the spine DR device does not need to be switched. The spine device 2 is still used as the spine DR device, and generates the instantiated configuration data of the third network device based on the configuration parameter of the third network device and the configuration command in the configuration template file corresponding to the type of the third network device, to complete instantiation configuration on the newly joined third network device and allocate a resource to the newly joined third network device. On the contrary, when the IPv6 ULA address of the spine device 2 is greater than the IPv6 ULA address of the third network device, it indicates that the IPv6 ULA address of the third network device is the smallest. In this case, the spine DR device needs to be switched, and the primary network device determines that the third network device is the spine DR device, namely, the new primary network device, and clears and releases a related resource. In addition, the third network device also compares the IPv6 ULA address of the spine device 2 with the IPv6 ULA address of the third network device. If the IPv6 ULA address of the spine device 2 is greater than the IPv6 ULA address of the third network device, the third network device determines that the third network device is the new primary network device. To complete subsequent instantiation configuration on another network device, the third network device needs to first determine the backup network device used for backup, and obtains the configuration template file by using the backup network device. In an embodiment, if dynamic data is generated in a process in which the spine device 2 generates the instantiated configuration data and is backed up in the backup network device, the third network device may also obtain the dynamic data by using the backup network device, to perform instantiation configuration on the another network device based on the obtained configuration template file and the dynamic data. It should be noted that, when it is determined whether to switch the spine DR, only the address information of the third network device is compared with the address information of the primary network device because the primary network device spine DR is a spine device with a smallest address. In the spine-leaf architecture, once address information is allocated, the address information does not change. Therefore, when it is determined whether the spine DR needs to be switched, only the address information of the newly joined third network device is compared with currently smallest address information of the primary network device. Certainly, the address information of the third network device may alternatively be compared with address information of each network device in the spine devices.

Figure 9:
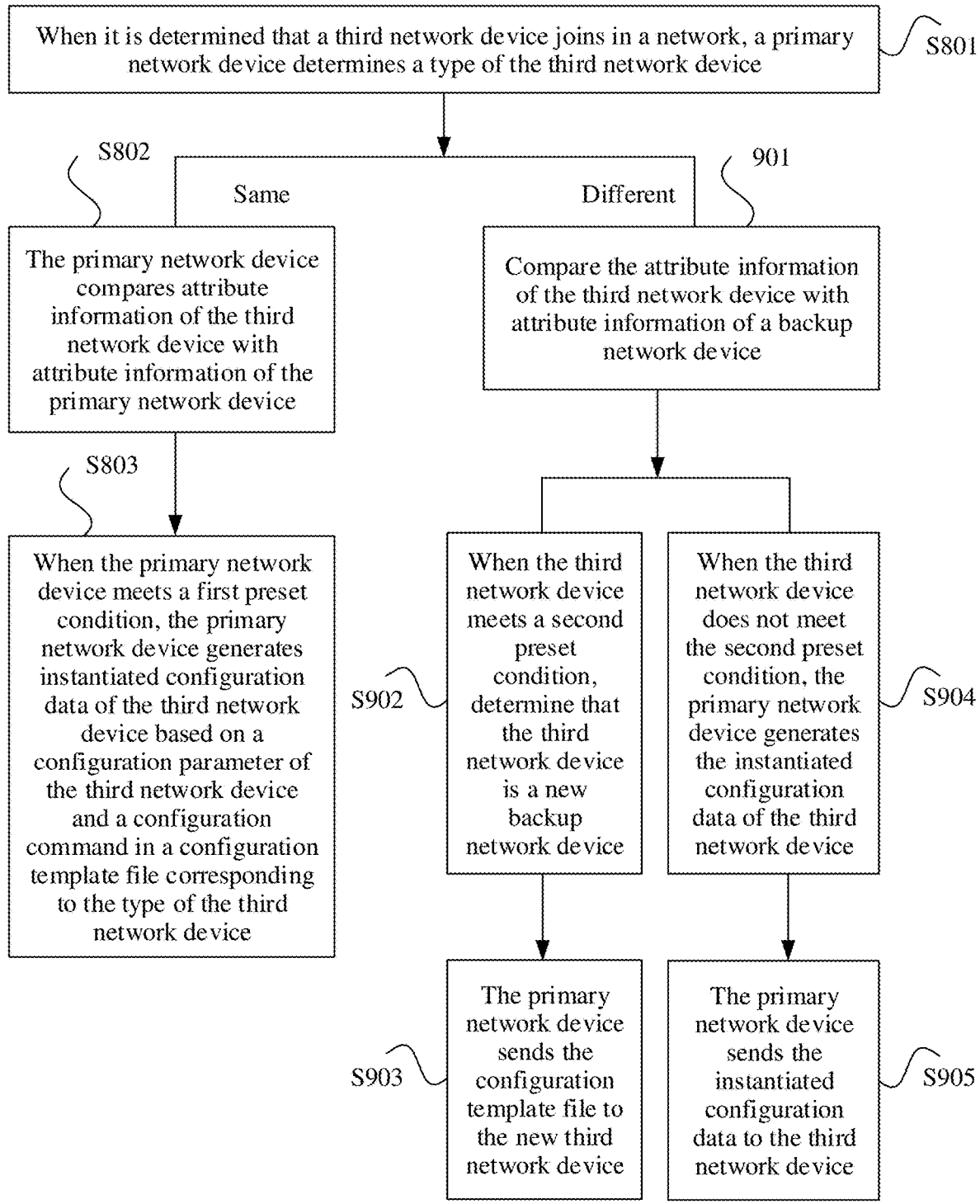
FIG. 9 is a schematic flowchart of another network configuration method according to an embodiment of this application.

In addition, it should be noted that, when the primary network device determines that the third network device joins the network in S801, and after the primary network device determines the type of the third network device, the following S901 to S903 or S901, S904, and S905 may be further performed. FIG. 9 is a schematic flowchart of another network configuration method according to an embodiment of this application.

S901: When the type of the third network device is different from the type of the primary network device, the primary network device compares the attribute information of the third network device with attribute information of the backup network device.

When the spine device 2 determines that the third network device is a leaf device, it indicates that the type of the third network device is different from the type of the primary network device. In this case, the spine device 2 needs to further compare the address information of the third network device with the address information of the leaf device 3 used for backup, to determine whether the leaf DR device needs to be switched.

It should also be noted that, when it is determined whether to switch the leaf DR, only the address information of the third network device is compared with address information of the backup network device because the backup network device leaf DR is a leaf device with a smallest address. In the spine-leaf architecture, once address information is allocated, the address information does not change. Therefore, when it is determined whether the leaf DR needs to be switched, only the address information of the newly joined third network device is compared with currently smallest address information of the backup network device. Certainly, the address information of the third network device may alternatively be compared with the address information of each network device in the leaf devices.

S902: When the third network device meets the second preset condition, determine that the third network device is a new backup network device.

When the IPv6 ULA address of the third network device is less than the IPv6 ULA address of the leaf device 3, it indicates that the IPv6 ULA address of the third network device is the smallest. In this case, the leaf DR device needs to be switched, and the primary network device determines that the third network device is the leaf DR device, namely, the new backup network device.

S903: The primary network device sends the configuration template file to the new backup network device.

After it is determined that the newly joined third network device is the new backup network device, the configuration template file may be sent to the new backup network device. After receiving the configuration template file, the new third network device also compares the IPv6 ULA address of the leaf device 3 with the IPv6 ULA address of the third network device. When the IPv6 ULA address of the leaf device 3 is greater than the IPv6 ULA address of the third network device, it is determined that the third network device is the new backup network device, receives the configuration template file sent by the spine device 2, and backs up the configuration template file. On the contrary, if the IPv6 ULA address of the leaf device 3 is less than the IPv6 ULA address of the third network device, the third network device determines that the third network device is not the new network device, and refuses to receive the configuration template file sent by the spine device 2.

In an embodiment, after S901 in which when the type of the third network device is different from the type of the primary network device, the primary network device compares the attribute information of the third network device with the attribute information of the backup network device, the following operation may be further included.

S904: When the third network device does not meet the second preset condition, the primary network device generates the instantiated configuration data of the third network device based on the configuration parameter of the third network device and the configuration command in the configuration template file corresponding to the type of the third network device.

When the third network device does not meet the second preset condition, to be specific, when the spine device 2 determines that the IPv6 ULA address of the third network device is greater than the IPv6 ULA address of the leaf device 3, it indicates that the third network device is not the leaf device with the smallest IPv6 ULA address. In this case, the leaf DR device does not need to be switched. In addition, the spine device 2 may generate the instantiated configuration data of the third network device based on the configuration parameter of the third network device and the configuration command in the configuration template file corresponding to the type of the third network device.

S905: The primary network device sends the instantiated configuration data to the third network device.

The spine device 2 sends the instantiated configuration data to the newly joined third network device, so that the third network device can configure the third network device based on the instantiated configuration data. This completes instantiation configuration of the third network device.

It should be noted that in this embodiment of this application, after S901, only one of S902 and S903 and S904 and S905 is performed. In other words, S902 and S903 and S904 and S905 are not simultaneously performed.

Figure 10:
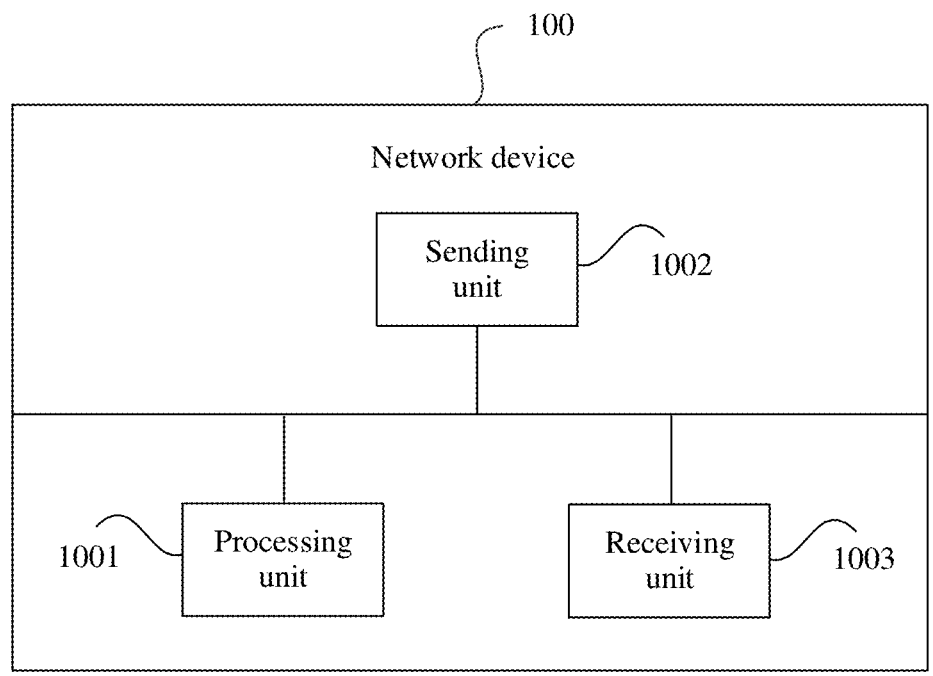
FIG. 10 is a schematic structural diagram of a network device according to an embodiment of this application.

FIG. 10 is a schematic structural diagram of a network device 100 according to an embodiment of this application. Referring to FIG. 10, the network device 100 is used as a primary network device and includes:

a processing unit 1001, configured to obtain a configuration template file based on a type of a to-be-configured network device, where the configuration template file corresponds to a network device of a same type, the configuration template file includes at least one configuration command, and the at least one configuration command is used to indicate a relationship between a configuration parameter of the to-be-configured network device and a configuration parameter of another network device; where the processing unit 1001 is further configured to generate instantiated configuration data of the to-be-configured network device based on the configuration parameter of the to-be-configured network device and the at least one configuration command; and a sending unit 1002, configured to send the instantiated configuration data to the to-be-configured network device, where the instantiated configuration data is used to instruct the to-be-configured network device to perform configuration based on the instantiated configuration data.

In an embodiment, the at least one configuration command includes a first configuration command, and the processing unit 1001 is specifically configured to: obtain a parameter of a first network device based on the first configuration command, where the first configuration command is used to indicate a relationship between the configuration parameter of the to-be-configured network device and the parameter of the first network device; and when the parameter of the first network device is obtained, generate the instantiated configuration data of the to-be-configured network device based on the configuration parameter of the to-be-configured network device, the first configuration command, and the parameter of the first network device.

In an embodiment, the processing unit 1001 is further specifically configured to: when the parameter of the first network device cannot be obtained, send the configuration parameter of the to-be-configured network device and the first configuration command to the to-be-configured network device, so that the to-be-configured network device generates the instantiated configuration data based on the configuration parameter of the to-be-configured network device and the first configuration command, and performs configuration based on the instantiated configuration data.

In an embodiment, the network device 100 may further include:

a receiving unit 1003, configured to receive a confirmation response message, where the confirmation response message is used to indicate that the instantiated configuration data is correct.

In an embodiment, the processing unit 1001 is further configured to compare: attribute information of the primary network device with attribute information of another network device of a type to which the primary network device belongs; and determine that the attribute information of the primary network device meets a first preset condition.

In an embodiment, the processing unit 1001 is specifically configured to: receive at least one configuration template file sent by a second network device, where the second network device is any network device 100 in a network; and determine the configuration template file in the at least one configuration template file based on the type of the to-be-configured network device.

In an embodiment, the processing unit 1001 is further configured to determine a backup network device based on a second preset condition, where a type of the backup network device is different from the type of the primary network device; and the sending unit 1002 is further configured to send a first backup indication message to the backup network device, where the first backup indication message includes the configuration template file, and the first backup indication message is used to indicate the backup network device to back up the configuration template file.

In an embodiment, the processing unit 1001 is further configured to: when it is determined that a third network device joins in the network, determine a type of the third network device; and when the type of the third network device is the same as the type of the primary network device, compare attribute information of the third network device with the attribute information of the primary network device.

When the attribute information of the primary network device meets the first preset condition, the processing unit 1001 generates instantiated configuration data of the third network device based on a configuration parameter of the third network device and a configuration command in a configuration template file corresponding to the type of the third network device.

In an embodiment, the processing unit 1001 is further configured to: when the attribute information of the third network device meets the first preset condition, determine that the third network device is a new primary network device, and clear the instantiated configuration data.

In an embodiment, the processing unit 1001 is further configured to: when the type of the third network device is different from the type of the primary network device, compare the attribute information of the third network device with attribute information of the backup network device; and when the attribute information of the third network device meets the second preset condition, determine that the third network device is a new backup network device; and the sending unit 1002 is further configured to send the configuration template file to the new backup network device.

In an embodiment, the processing unit 1001 is further configured to: when the attribute information of the third network device does not meet the second preset condition, the primary network device generates the instantiated configuration data of the third network device based on the configuration parameter of the third network device and the configuration command in the configuration template file corresponding to the type of the third network device; and the sending unit 1002 is further configured to send the instantiated configuration data to the third network device.

The network device 100 shown in this embodiment of this application may perform the operations and the methods performed by the primary network device in the embodiments corresponding to FIG. 2 to FIG. 9. An implementation principle and a beneficial effect of the network device 100 are similar to those of the primary network device in the embodiments corresponding to FIG. 2 to FIG. 9, and details are not described herein.

Figure 11:
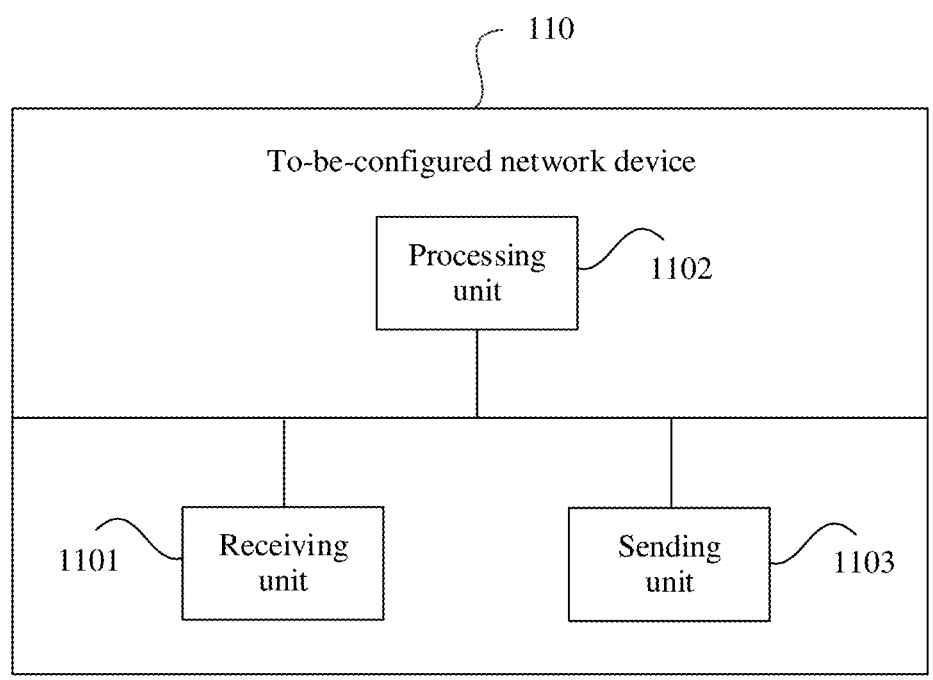
FIG. 11 is a schematic structural diagram of a to-be-configured network device according to an embodiment of this application.

FIG. 11 is a schematic structural diagram of a to-be-configured network device 110 according to an embodiment of this application. Referring to FIG. 11, the to-be-configured network device 110 may further include:

a receiving unit 1101, configured to receive instantiated configuration data sent by a primary network device, where the instantiated configuration data is generated by the primary network device based on a configuration parameter of the to-be-configured network device 110 and at least one configuration command included in a configuration template file, the configuration template file is obtained by the primary network device based on a type of the to-be-configured network device 110, the configuration template file corresponds to a network device of a same type, and the configuration command is used to indicate a relationship between the configuration parameter of the to-be-configured network device 110 and a configuration parameter of another network device; and a processing unit 1102, configured to configure the to-be-configured network device 110 based on the instantiated configuration data.

In an embodiment, the at least one configuration command includes a first configuration command, the first configuration command is used to indicate a relationship between the configuration parameter of the to-be-configured network device 110 and a parameter of a first network device, and when the primary network device cannot obtain the parameter of the first network device, the receiving unit 1101 is further configured to receive the configuration parameter of the to-be-configured network device 110 and the first configuration command that are sent by the primary network device; and the processing unit 1102 is configured to: obtain the parameter of the first network device based on the first configuration command; and generate the instantiated configuration data based on the configuration parameter of the to-be-configured network device 110, the first configuration command, and the parameter of the first network device.

In an embodiment, when the instantiated configuration data includes resource data, the to-be-configured network device 110 may further include:

a sending unit 1103, configured to send the resource data to the primary network device, where the resource data is resource data generated in a process in which the to-be-configured network generates the instantiated configuration data.

The to-be-configured network device 110 shown in this embodiment of this application may perform the operations and the methods performed by the to-be-configured network device in the embodiments corresponding to FIG. 2 to FIG. 9. An implementation principle and a beneficial effect of the to-be-configured network device 110 are similar to those of the to-be-configured network device in the embodiments corresponding to FIG. 2 to FIG. 9, and details are not described herein.

Figure 12:
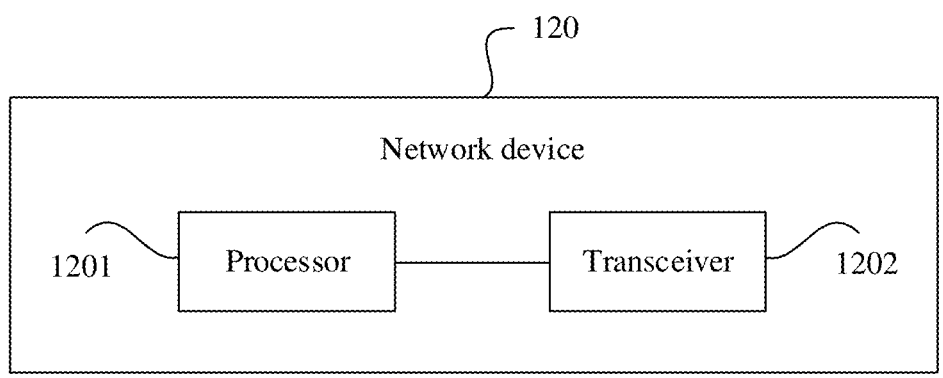
FIG. 12 is a schematic structural diagram of another network device according to an embodiment of this application.

FIG. 12 is a schematic structural diagram of another network device 120 according to an embodiment of this application. As shown in FIG. 12, the network device 120 is used as a primary network device and includes:

a processor 1201, configured to obtain a configuration template file based on a type of a to-be-configured network device, where the configuration template file corresponds to a network device of a same type, the configuration template file includes at least one configuration command, and the at least one configuration command is used to indicate a relationship between a configuration parameter of the to-be-configured network device and a configuration parameter of another network device; where the processor 1201 is configured to generate instantiated configuration data of the to-be-configured network device based on the configuration parameter of the to-be-configured network device and the at least one configuration command; and a transceiver 1202, configured to send the instantiated configuration data to the to-be-configured network device, where the instantiated configuration data is used to instruct the to-be-configured network device to perform configuration based on the instantiated configuration data.

In an embodiment, the at least one configuration command includes a first configuration command, and the processor 1201 is specifically configured to: obtain a parameter of a first network device based on the first configuration command, where the first configuration command is used to indicate a relationship between the configuration parameter of the to-be-configured network device and the parameter of the first network device; and when the primary network device obtains the parameter of the first network device, generate the instantiated configuration data of the to-be-configured network device based on the configuration parameter of the to-be-configured network device, the first configuration command, and the parameter of the first network device.

In an embodiment, the processor 1201 is further specifically configured to: when the parameter of the first network device cannot be obtained, send the configuration parameter of the to-be-configured network device and the first configuration command to the to-be-configured network device, so that the to-be-configured network device generates the instantiated configuration data based on the configuration parameter of the to-be-configured network device and the first configuration command, and performs configuration based on the instantiated configuration data.

In an embodiment, the transceiver 1202 is further configured to receive a confirmation response message, where the confirmation response message is used to indicate that the instantiated configuration data is correct.

In an embodiment, the processor 1201 is further configured to compare attribute information of the primary network device with attribute information of another network device of a type to which the primary network device belongs; and determine that the attribute information of the primary network device meets a first preset condition.

In an embodiment, the transceiver 1202 is specifically configured to receive at least one configuration template file sent by a second network device, where the second network device is any network device in a network; and the processor 1201 is configured to determine the configuration template file in the at least one configuration template file based on the type of the to-be-configured network device.

In an embodiment, the processor 1201 is further configured to determine a backup network device based on a second preset condition, where a type of the backup network device is different from the type of the primary network device; and the transceiver 1202 is further configured to send a first backup indication message to the backup network device, where the first backup indication message includes the configuration template file, and the first backup indication message is used to indicate the backup network device to back up the configuration template file.

In an embodiment, the processor 1201 is further configured to: when it is determined that a third network device joins in the network, determine a type of the third network device; when the type of the third network device is the same as the type of the primary network device, compare attribute information of the third network device with the attribute information of the primary network device; and when the attribute information of the primary network device meets the first preset condition, generate instantiated configuration data of the third network device based on a configuration parameter of the third network device and a configuration command in a configuration template file corresponding to the type of the third network device.

In an embodiment, the processor 1201 is further configured to: when the attribute information of the third network device meets the first preset condition, determine that the third network device is a new primary network device, and clear the instantiated configuration data.

In an embodiment, the processor 1201 is further configured to: when the type of the third network device is different from the type of the primary network device, compare the attribute information of the third network device with attribute information of the backup network device; and when the attribute information of the third network device meets the second preset condition, determine that the third network device is a new backup network device; and the transceiver 1202 is configured to send the configuration template file to the new backup network device.

In an embodiment, the processor 1201 is further configured to: when the attribute information of the third network device does not meet the second preset condition, generate the instantiated configuration data of the third network device based on the configuration parameter of the third network device and the configuration command in the configuration template file corresponding to the type of the third network device; and the transceiver 1202 is configured to send the instantiated configuration data to the third network device.

The network device 120 shown in this embodiment of this application may perform the operations and the methods performed by the primary network device in the embodiments corresponding to FIG. 2 to FIG. 9. An implementation principle and a beneficial effect of the network device 120 are similar to those of the primary network device in the embodiments corresponding to FIG. 2 to FIG. 9, and details are not described herein.

Figure 13:
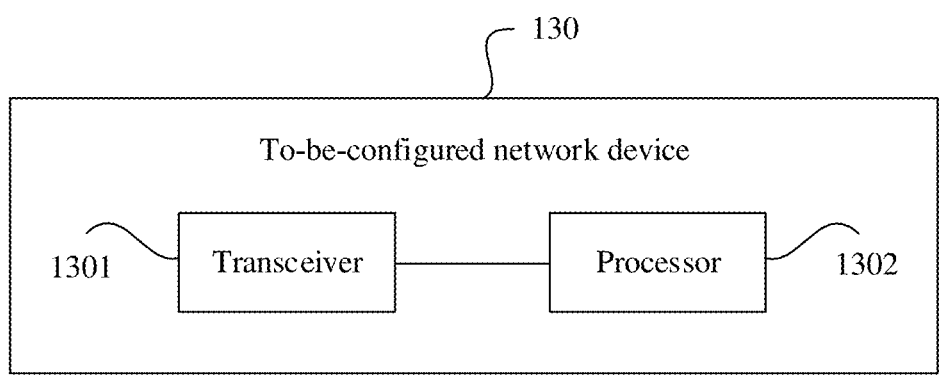
FIG. 13 is a schematic structural diagram of another to-be-configured network device according to an embodiment of this application.

FIG. 13 is a schematic structural diagram of another to-be-configured network device 130 according to an embodiment of this application. Referring to FIG. 13, the to-be-configured network device 130 may include:

a transceiver 1301, configured to receive instantiated configuration data sent by a primary network device, where the instantiated configuration data is generated by the primary network device based on a configuration parameter of the to-be-configured network device 130 and at least one configuration command included in a configuration template file, the configuration template file is obtained by the primary network device based on a type of the to-be-configured network device 130, the configuration template file corresponds to a network device of a same type, and the configuration command is used to indicate a relationship between the configuration parameter of the to-be-configured network device 130 and a configuration parameter of another network device; and a processor 1302, configured to configure the to-be-configured network device 130 based on the instantiated configuration data.

In an embodiment, the at least one configuration command includes a first configuration command, the first configuration command is used to indicate a relationship between the configuration parameter of the to-be-configured network device 130 and a parameter of a first network device, and when the primary network device cannot obtain the parameter of the first network device, the transceiver 1301 is further configured to receive the configuration parameter of the to-be-configured network device 130 and the first configuration command that are sent by the primary network device.

The processor 1302 is configured to obtain the parameter of the first network device based on the first configuration command; and generate the instantiated configuration based on the configuration parameter of the to-be-configured network device 130, the first configuration command, and the parameter of the first network device.

In an embodiment, when the instantiated configuration data includes resource data, the transceiver 1301 is further configured to send the resource data to the primary network device, where the resource data is resource data generated in a process in which the to-be-configured network generates the instantiated configuration data.

The to-be-configured network device 130 shown in this embodiment of this application may perform the operations and the methods performed by the to-be-configured network device in the embodiments corresponding to FIG. 2 to FIG. 9. An implementation principle and a beneficial effect of the to-be-configured network device 130 are similar to those of the to-be-configured network device in the embodiments corresponding to FIG. 2 to FIG. 9, and details are not described herein.

Figure 14:
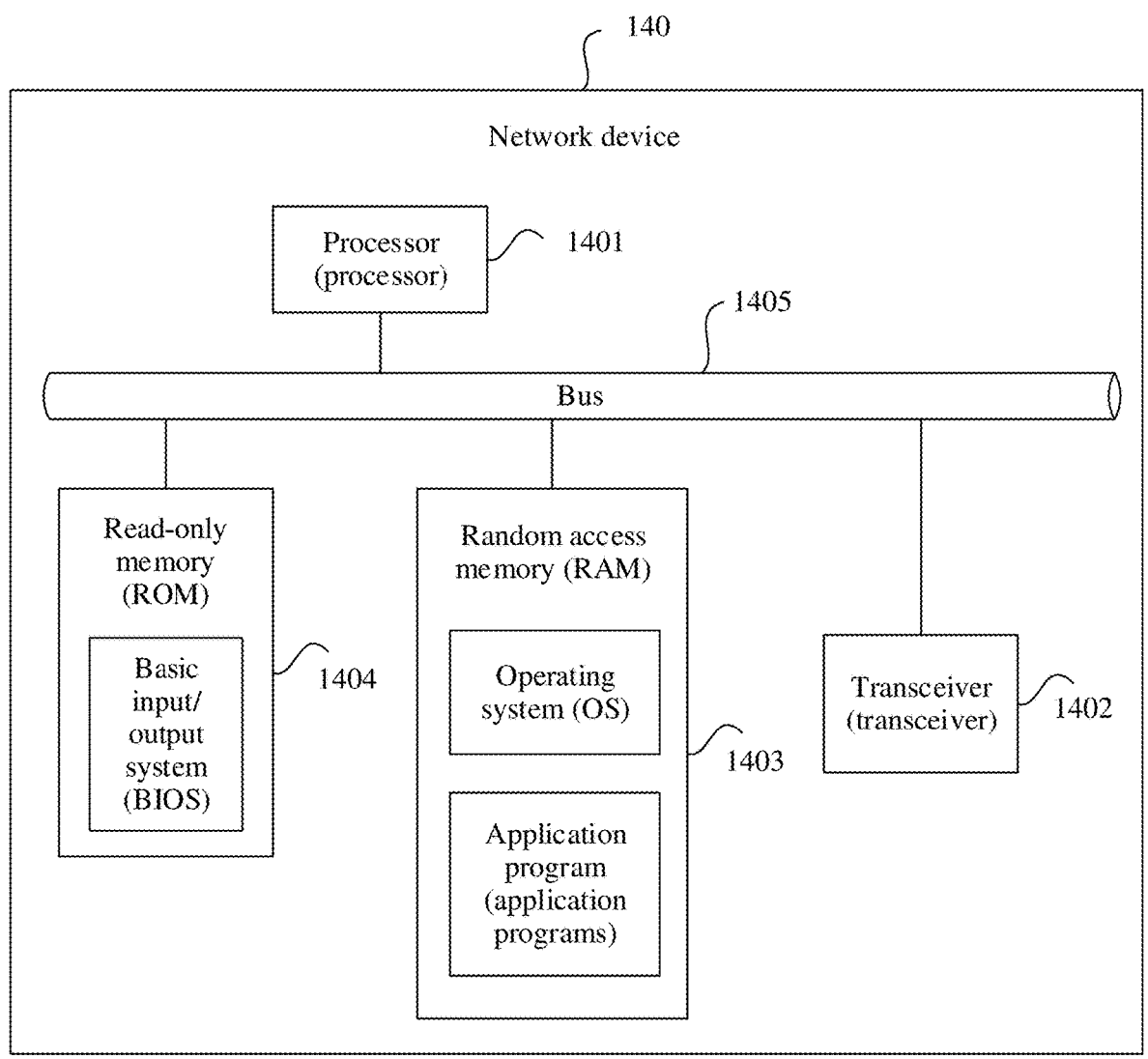
FIG. 14 is a schematic structural diagram of another network device according to an embodiment of this application.

FIG. 14 is a schematic structural diagram of still another network device 140 according to an embodiment of this application. Referring to FIG. 14, the network device 140 is used as a primary network device, and includes a processor 1401, a transceiver 1402, a random access memory 1403, a read-only memory 1404, and a bus 1405. The processor 1401 is separately coupled to a transmitter, the random access memory 1403, and the read-only memory 1404 by using the bus 1405. When the network device 140 needs to be run, the network device 140 is started by using a basic input/output system built into the read-only memory 1404 or a bootloader bootstrap system in an embedded system, to boot the network device 140 to enter a normal running state. After the network device 140 enters the normal running state, an application program and an operating system run in the random access memory 1403, so that the processor 1401 is configured to: obtain a configuration template file based on a type of a to-be-configured network device, where the configuration template file corresponds to a network device of a same type, the configuration template file includes at least one configuration command, and the at least one configuration command is used to indicate a relationship between a configuration parameter of the to-be-configured network device and a configuration parameter of another network device; and generate instantiated configuration data of the to-be-configured network device based on the configuration parameter of the to-be-configured network device and the at least one configuration command; and the transceiver 1402 is configured to send the instantiated configuration data to the to-be-configured network device, where the instantiated configuration data is used to instruct the to-be-configured network device to perform configuration based on the instantiated configuration data.

The network device 140 provided in this embodiment of this application may correspond to the primary network device in the embodiments corresponding to FIG. 2 to FIG. 9. In addition, the processor 1401, the transceiver 1402, and the like in the network device 140 may implement functions provided by and/or the operations and the methods implemented by the network device 140 in the embodiments corresponding to FIG. 2 to FIG. 9. The processor 1401 is configured to perform all operations of the processing unit of the network device 100 in FIG. 10, and the transceiver 1402 is configured to perform all operations of the receiving unit and the sending unit of the network device 100 in FIG. 10. For brevity, details are not described herein.

Figure 15:
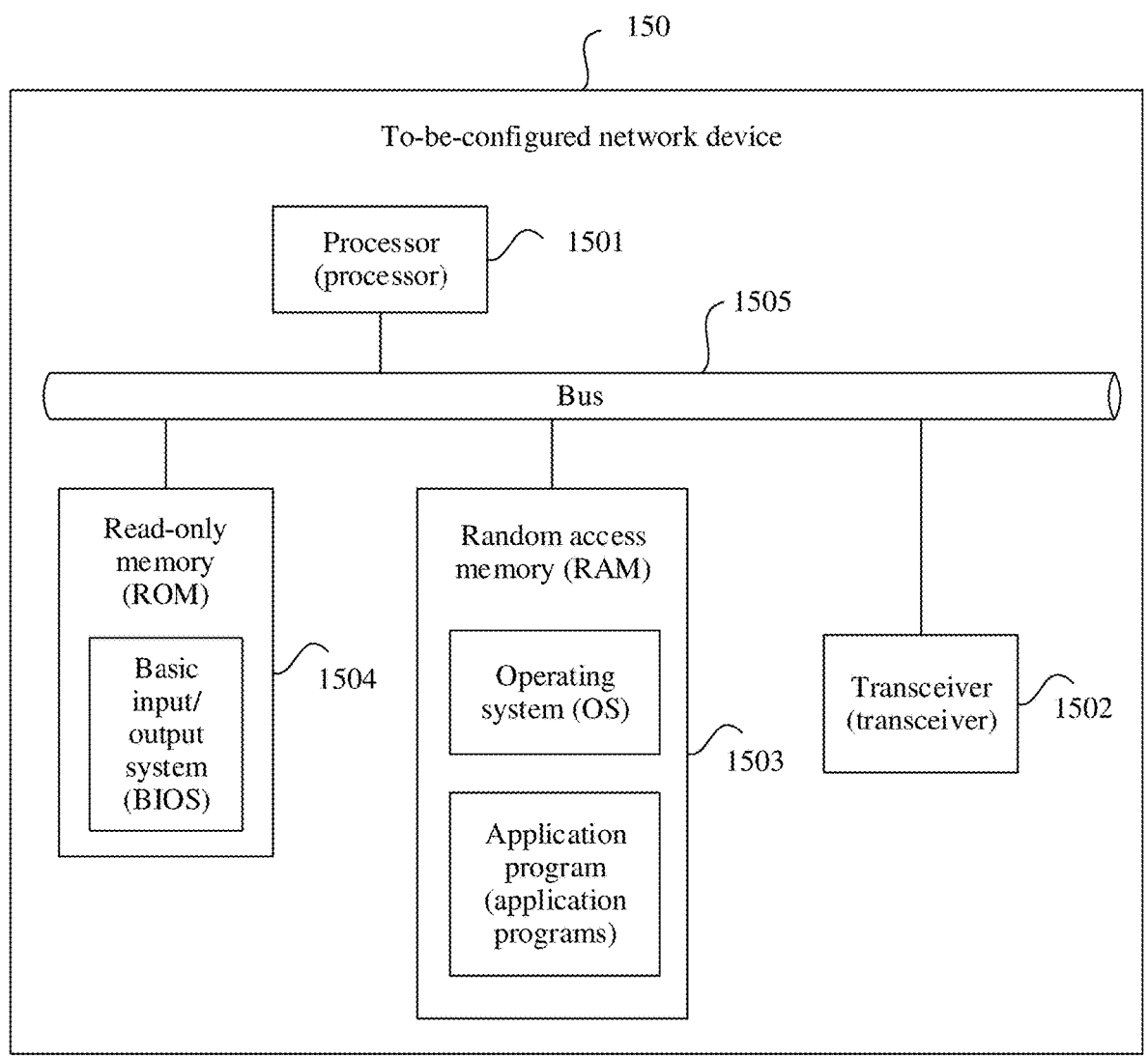
FIG. 15 is a schematic structural diagram of another to-be-configured network device according to an embodiment of this application.

FIG. 15 is a schematic structural diagram of still another to-be-configured network device 150 according to an embodiment of this application. Referring to FIG. 15, the to-be-configured network device 150 includes a processor 1501, a transceiver 1502, a random access memory 1503, a read-only memory 1504, and a bus 1505. The processor 1501 is separately coupled to a transmitter, the random access memory 1503, and the read-only memory 1504 by using the bus 1505. When the to-be-configured network device 150 needs to be run, the to-be-configured network device 150 is started by using a basic input/output system built into the read-only memory 1504 or a bootloader bootstrap system in an embedded system, to boot the to-be-configured network device 150 to enter a normal running state. After the to-be-configured network device 150 enters the normal running state, an application program and an operating system run in the random access memory 1503, so that the transceiver 1502 is configured to: receive instantiated configuration data sent by a primary network device, where the instantiated configuration data is generated by the primary network device based on a configuration parameter of the to-be-configured network device 150 and at least one configuration command included in a configuration template file, the configuration template file is obtained by the primary network device based on a type of the to-be-configured network device 150, the configuration template file corresponds to a network device of a same type, and the configuration command is used to indicate a relationship between the configuration parameter of the to-be-configured network device 150 and a configuration parameter of another network device; and the processor 1501 is configured to configure the to-be-configured network device 150 based on the instantiated configuration data.

The to-be-configured network device 150 provided in this embodiment of this application may correspond to the to-be-configured network device in the embodiments corresponding to FIG. 2 to FIG. 9. In addition, the processor 1501, the transceiver 1502, and the like in the to-be-configured network device 150 may implement functions provided by and/or the operations and the methods implemented by the to-be-configured network device in the embodiments corresponding to FIG. 2 to FIG. 9. The processor 1501 is configured to perform all operations of the processing unit of the to-be-configured network device 110 in FIG. 11, and the transceiver 1502 is configured to perform all operations of the receiving unit of the to-be-configured network device 150 in FIG. 11. For brevity, details are not described herein.

Figure 16:
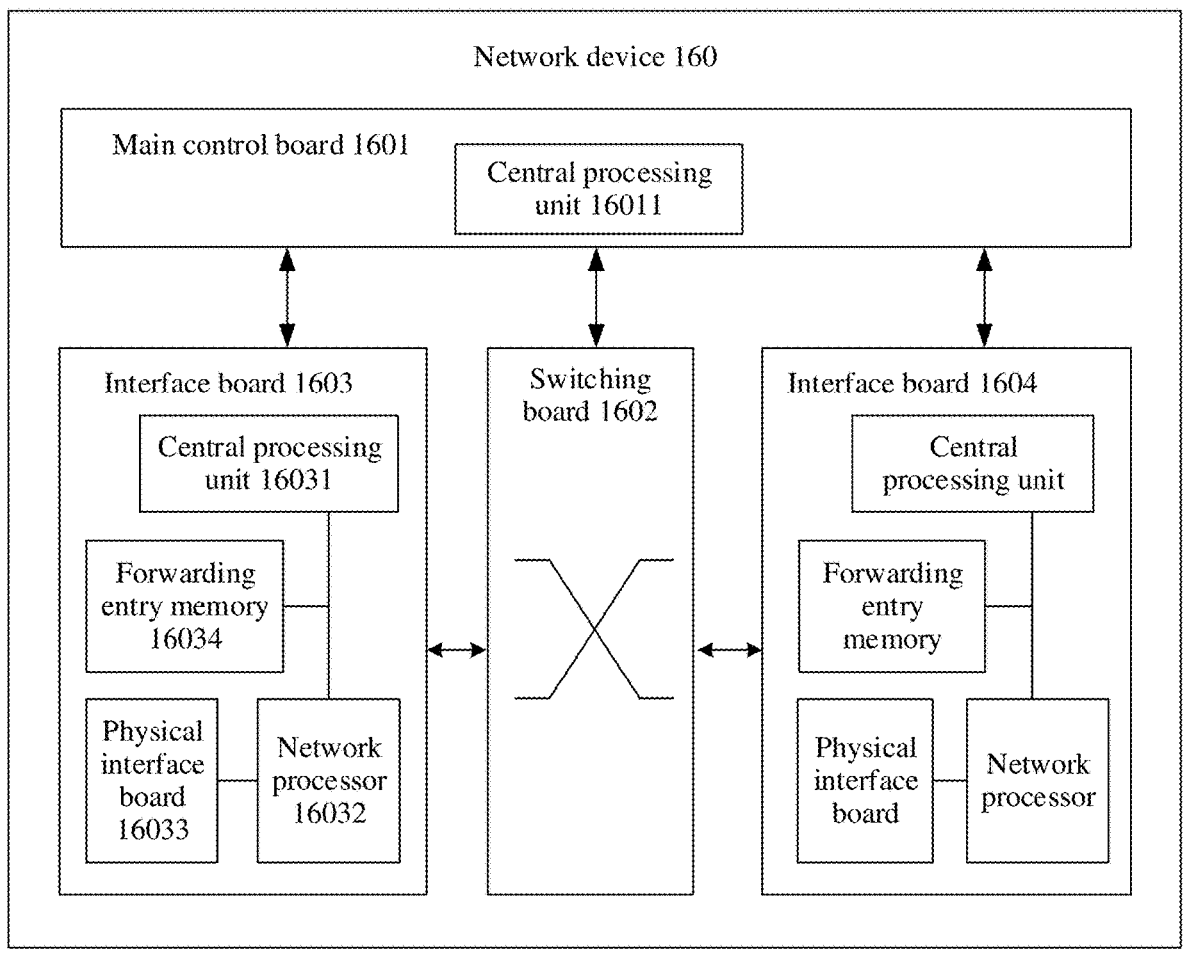
FIG. 16 is a schematic structural diagram of another network device according to an embodiment of this application.

FIG. 16 is a schematic structural diagram of yet another network device 160 according to an embodiment of this application. The network device 160 is used as a primary network device, and includes a main control board 1601, an interface board 1603, a switching board 1602, and an interface board 1604. The main control board 1601 is configured to complete functions such as system management, device maintenance, and protocol processing. The switching board 1602 is configured to complete data exchange between interface boards (the interface board is also referred to as a line card or a service board). The interface boards 1603 and 1604 are configured to provide various service interfaces (for example, an Ethernet interface and a POS interface), and implement data packet forwarding. The main control board 1601, the interface boards 1603 and 1604, and the switching board 1602 are connected to a system backboard by using a system bus for communication. A central processing unit 16031 on the interface board 1603 is configured to control and manage the interface board, and communicate with a central processing unit 16011 on the main control board 1601.

The central processing unit 16011 on the main control board 1601 is configured to obtain a configuration template file based on a type of a to-be-configured network device, and is further configured to: generate instantiated configuration data of the to-be-configured network device based on a configuration parameter of the to-be-configured network device and at least one configuration command (for details, refer to descriptions of related parts in FIG. 2 to FIG. 9, and details are not described herein), and encapsulate the instantiated configuration data into an IP packet to deliver the IP packet to the interface board 1603 or 1604. A destination IP address in a header of the IP packet is an IP address of the to-be-configured network device. A network processor 16032 on the interface board 1603 searches, according to the IP address of the to-be-configured network device, a forwarding table (which stores an association relationship between an IP address and an outbound interface) stored in a forwarding entry memory 16034, and obtains a forwarding entry that matches the IP address of the to-be-configured network device. Therefore, an outbound interface 1 corresponding to the IP address of the to-be-configured network device is further obtained, and the outbound interface 1 is located on a physical interface card 16033. The physical interface card 16033 is configured to send the instantiated configuration data to the to-be-configured network device.

In an embodiment, the central processing unit 16011 on the main control board 1601 is further configured to: obtain a parameter of a first network device based on a first configuration command, where the first configuration command is used to indicate a relationship between the configuration parameter of the to-be-configured network device and the parameter of the first network device; and when the parameter of the first network device is obtained, generate the instantiated configuration data of the to-be-configured network device based on the configuration parameter of the to-be-configured network device, the first configuration command, and the parameter of the first network device.

In an embodiment, the physical interface card 16033 on the interface board 1603 is further configured to: when the parameter of the first network device cannot be obtained, send the configuration parameter of the to-be-configured network device and the first configuration command to the to-be-configured network device, so that the to-be-configured network device generates the instantiated configuration data based on the configuration parameter of the to-be-configured network device and the first configuration command, and performs configuration based on the instantiated configuration data.

In an embodiment, the physical interface card 16033 on the interface board 1603 is further configured to receive a confirmation response message, where the confirmation response message is used to indicate that the instantiated configuration data is correct.

In an embodiment, the central processing unit 16011 on the main control board 1601 is further configured to: compare attribute information of the primary network device with attribute information of another network device of a type to which the primary network device belongs; and determine that the attribute information of the primary network device meets a first preset condition.

In an embodiment, the physical interface card 16033 on the interface board 1603 is further configured to receive at least one configuration template file from a second network device, where the second network device is any network device in a network. The central processing unit 16011 on the main control board 1601 is further configured to determine the configuration template file in the at least one configuration template file based on the type of the to-be-configured network device.

In an embodiment, the central processing unit 16011 on the main control board 1601 is further configured to determine a backup network device based on a second preset condition, where a type of the backup network device is different from the type of the primary network device. The physical interface card 16033 on the interface board 1603 is further configured to send a first backup indication message to the backup network device, where the first backup indication message includes the configuration template file, and the first backup indication message is used to indicate the backup network device to back up the configuration template file.

In an embodiment, the central processing unit 16011 on the main control board 1601 is further configured to: when it is determined that a third network device joins in the network, determine a type of the third network device; when the type of the third network device is the same as the type of the primary network device, compare attribute information of the third network device with the attribute information of the primary network device 160; and when the attribute information of the primary network device 160 meets the first preset condition, generate instantiated configuration data of the third network device based on a configuration parameter of the third network device and a configuration command in a configuration template file corresponding to the type of the third network device.

In an embodiment, the central processing unit 16011 on the main control board 1601 is further configured to: when the attribute information of the third network device meets the first preset condition, determine that the third network device is a new primary network device, and clear the instantiated configuration data.

In an embodiment, the central processing unit 16011 on the main control board 1601 is further configured to: when the type of the third network device is different from the type of the primary network device, compare the attribute information of the third network device with attribute information of the backup network device; and when the attribute information of the third network device meets the second preset condition, determine that the third network device is a new backup network device. The physical interface card 16033 on the interface board 1603 is further configured to send the configuration template file to the new backup network device.

In an embodiment, when the attribute information of the third network device does not meet the second preset condition, the central processing unit 16011 on the main control board 1601 is further configured to generate the instantiated configuration data of the third network device based on the configuration parameter of the third network device and the configuration command in the configuration template file corresponding to the type of the third network device. The physical interface card 16033 on the interface board 1603 is further configured to send the instantiated configuration data to the third network device.

It should be understood that an operation performed on the interface board 1604 is consistent with an operation performed on the interface board 1603 in this embodiment of this application. For brevity, details are not described. It should be understood that the network device in this embodiment may correspond to the network device in the embodiments corresponding to FIG. 2 to FIG. 9. The main control board 1601, the interface board 1603, and/or the interface board 1604 in the network device 160 may implement functions provided by and/or the operations implemented by the network device in the embodiments corresponding to FIG. 2 to FIG. 9. For brevity, details are not described herein.

It should be noted that, there may be one main control board or a plurality of main control boards, and when there is a plurality of main control boards, the main control boards may include an active main control board and a standby main control board. There may be one or more interface boards, and the network device 160 having a stronger data processing capability provides more interface boards. There may also be one or more physical interface cards on the interface board. There may be no switching board or there may be one or more switching boards. When there is a plurality of switching boards, load sharing and redundancy backup may be implemented together. In a centralized forwarding architecture, the network device 160 may need no switching board, and the interface board provides a function of processing service data of an entire system. In a distributed forwarding architecture, the network device 160 may have at least one switching board, and data exchange between a plurality of interface boards is performed by using the switching board, to provide a large-capacity data exchange and processing capability. Therefore, a data access and processing capability of the network device 160 in the distributed architecture is better than that of the device in the centralized architecture. In an embodiment, the network device 160 in another form may have only one card. To be specific, there is no switching board, and functions of an interface board and a main control board are integrated on the card. In this case, a central processing unit on the interface board and a central processing unit on the main control board may be combined into one central processing unit on the card, to perform functions after the two central processing units combined. A device in this form (for example, the network device 160 such as a low-end switch or router) has a relatively weak data exchange and processing capability. Which architecture is specifically used depends on a specific networking deployment scenario, and this is not limited herein.

Figure 17:
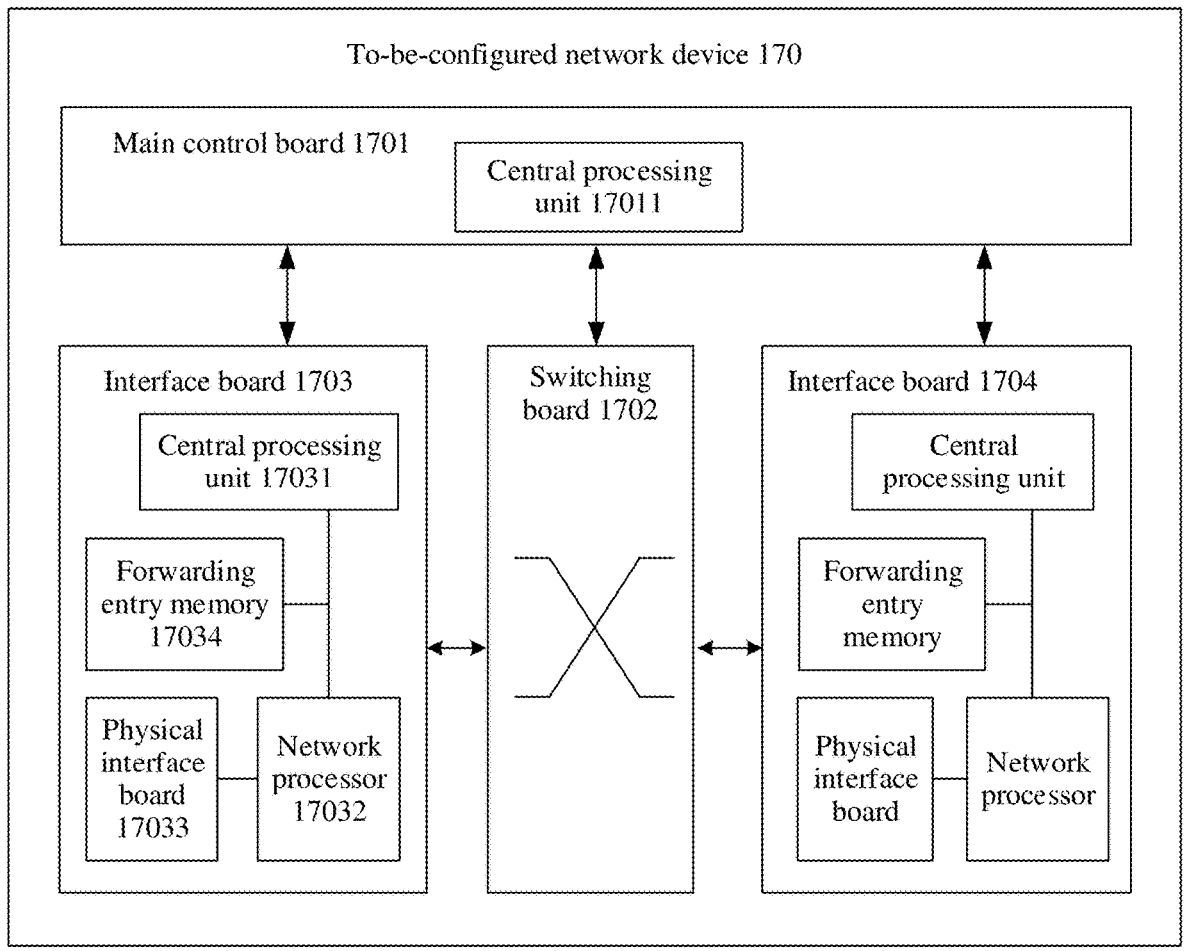
FIG. 17 is a schematic structural diagram of another to-be-configured network device according to an embodiment of this application.

FIG. 17 is a schematic structural diagram of yet another to-be-configured network device 170 according to an embodiment of this application. Referring to FIG. 17, the to-be-configured network device 170 includes a main control board 1701, an interface board 1703, a switching board 1702, and an interface board 1704. The main control board 1701 is configured to complete functions such as system management, device maintenance, and protocol processing. The switching board 1702 is configured to complete data exchange between interface boards (the interface board is also referred to as a line card or a service board). The interface boards 1703 and 1704 are configured to provide various service interfaces (for example, an Ethernet interface and a POS interface), and implement data packet forwarding. The main control board 1701, the interface boards 1703 and 1704, and the switching board 1702 are connected to a system backboard by using a system bus for communication. A central processing unit 17031 on the interface board 1703 is configured to control and manage the interface board, and communicate with a central processing unit 17011 on the main control board 1701.

A physical interface card 17033 on the interface board 1703 is configured to receive an IP packet encapsulated with instantiated configuration data and sent by a primary network device, where a destination IP address in a header of the IP packet is an IP address of the to-be-configured network device. The IP packet is sent to a network processor 17032 on the interface board 1703. The network processor 17032 searches, according to the destination IP address (the IP address of the to-be-configured network device), a forwarding table (which stores an association relationship between an IP address and an outbound interface) stored in a forwarding entry memory 17034. Then, the IP packet is sent to the central processing unit 17011 on the main control board 1701 by using the central processing unit 17031 on the interface board 1703.

The central processing unit 17011 on the main control board 1701 is configured to configure the to-be-configured network device 170 based on the instantiated configuration data.

In an embodiment, at least one configuration command includes a first configuration command, the first configuration command is used to indicate a relationship between a configuration parameter of the to-be-configured network device and a parameter of a first network device, and when the primary network device cannot obtain the parameter of the first network device, the physical interface card 17033 on the interface board 1703 is further configured to receive the configuration parameter of the to-be-configured network device 170 and the first configuration command that are sent by the primary network device.

The central processing unit 17011 on the main control board 1701 is further configured to: obtain the parameter of the first network device based on the first configuration command; and generate the instantiated configuration based on the configuration parameter of the to-be-configured network device 170, the first configuration command, and the parameter of the first network device.

It should be understood that an operation performed on the interface board 1704 is consistent with an operation performed on the interface board 1703 in this embodiment of this application. For brevity, details are not described. It should be understood that the to-be-configured network device 170 in this embodiment may correspond to the to-be-configured network device in the embodiments corresponding to FIG. 2 to FIG. 9. The main control board 1701, the interface board 1703, and/or the interface board 1704 in the to-be-configured network device 170 may implement functions provided by and/or the operations implemented by the to-be-configured network device in the embodiments corresponding to FIG. 2 to FIG. 9. For brevity, details are not described herein.

It should be noted that, there may be one main control board or a plurality of main control boards, and when there is a plurality of main control boards, the main control boards may include an active main control board and a standby main control board. There may be one or more interface boards, and the to-be-configured network device 170 having a stronger data processing capability provides more interface boards. There may also be one or more physical interface cards on the interface board. There may be no switching board or there may be one or more switching boards. When there is a plurality of switching boards, load sharing and redundancy backup may be implemented together. In a centralized forwarding architecture, the to-be-configured network device 170 may need no switching board, and the interface board provides a function of processing service data of an entire system. In a distributed forwarding architecture, the to-be-configured network device 170 may have at least one switching board, and data exchange between a plurality of interface boards is performed by using the switching board, to provide a large-capacity data exchange and processing capability. Therefore, a data access and processing capability of the to-be-configured network device 170 in the distributed architecture is better than that of the device in the centralized architecture. In an embodiment, the to-be-configured network device 170 in another form may have only one card. To be specific, there is no switching board, and functions of an interface board and a main control board are integrated on the card. In this case, a central processing unit on the interface board and a central processing unit on the main control board may be combined into one central processing unit on the card, to perform functions after the two central processing units combined. A device in this form (for example, the to-be-configured network device 170 such as a low-end switch or router) has a relatively weak data exchange and processing capability. Which architecture is specifically used depends on a specific networking deployment scenario, and this is not limited herein.

Figure 18:
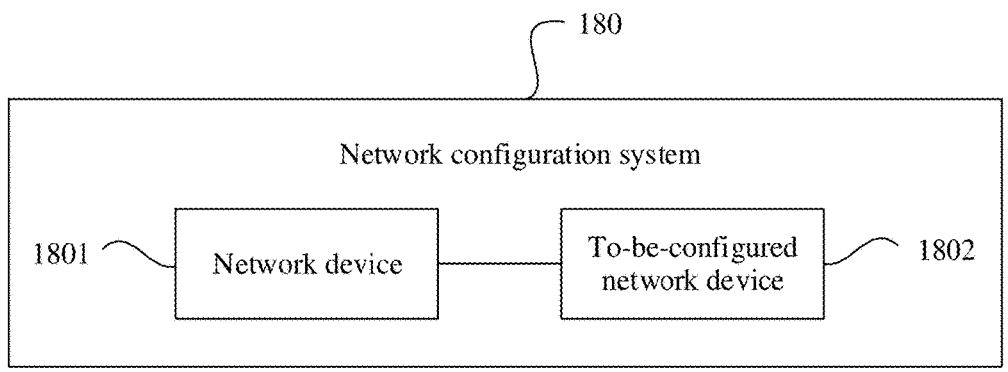
FIG. 18 is a schematic structural diagram of a network configuration system according to an embodiment of this application.

FIG. 18 is a schematic structural diagram of a network configuration system 180 according to an embodiment of this application. The network configuration system 180 includes the network device 1801 shown in any one of the foregoing embodiments and the to-be-configured network device 1802 shown in any one of the foregoing embodiments. An implementation principle and a beneficial effect of the network configuration system 180 are similar to those of the network device 1801 shown in any one of the foregoing embodiments and the to-be-configured network device 1802 shown in any one of the foregoing embodiments, and details are not described herein.

An embodiment of this application further provides a computer storage medium, including an instruction. When the instruction is run on a network device, the network device is enabled to perform the operations and the methods performed by the network device in the embodiments corresponding to FIG. 2 to FIG. 9. An implementation principle and a beneficial effect of the computer storage medium are similar to those of the network device in the embodiments corresponding to FIG. 2 to FIG. 9, and details are not described herein.

An embodiment of this application further provides a computer storage medium, including an instruction. When the instruction is run on a to-be-configured network device, the to-be-configured network device is enabled to perform the operations and the methods performed by the to-be-configured network device in the embodiments corresponding to FIG. 2 to FIG. 9. An implementation principle and a beneficial effect of the computer storage medium are similar to those of the to-be-configured network device in the embodiments corresponding to FIG. 2 to FIG. 9, and details are not described herein.

An embodiment of this application further provides a chip. The chip stores a computer program. The computer program is executed by a processor, to perform the operations and the methods implemented by the network device in the embodiments corresponding to FIG. 2 to FIG. 9, or the computer program is executed by a processor, to perform the operations and the methods implemented by the to-be-configured network device in the embodiments corresponding to FIG. 2 to FIG. 9. An implementation principle and a beneficial effect of the chip are similar to those of the network device or the to-be-configured network device in the embodiments corresponding to FIG. 2 to FIG. 9, and details are not described herein.

The processor in the foregoing embodiments may be a general-purpose processor, a digital signal processor (DSP), an application-specific integrated circuit (ASIC), a field programmable gate array (FPGA) or another programmable logic device, a discrete gate or transistor logic device, or a discrete hardware component. The methods, the operations, and logical block diagrams that are disclosed in the embodiments of this application may be implemented or performed. The general-purpose processor may be a microprocessor, or the processor may be any conventional processor or the like. The operations of the methods disclosed with reference to the embodiments of this application may be directly executed and completed by using a hardware decoding processor, or may be executed and completed by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in a memory, and the processor reads an instruction in the memory and completes the operations in the foregoing methods in combination with hardware of the processor.

In the several embodiments provided in this application, it should be understood that the disclosed apparatus and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed to a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a combination of hardware and a software functional unit.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network configuration method, comprising:
    comparing attribute information of a primary network device with attribute information of another network device of a same type before obtaining instantiated configuration data, wherein the primary network device is a spine device configured to perform instantiation configuration on other network devices in a spine-leaf network architecture;
    determining that the attribute information of the primary network device meets a first preset condition;
    obtaining instantiated configuration data based on a configuration parameter of a to-be-configured network device and at least one configuration command comprised in a configuration template file corresponding to a type of network devices of a same type, wherein the at least one configuration command indicates a relationship between the configuration parameter of the to-be-configured network device and a configuration parameter of the another network device; and
    instructing the to-be-configured network device to perform configuration based on the instantiated configuration data.

2. The method according to claim 1, wherein the at least one configuration command comprises a first configuration command indicating a relationship between the configuration parameter of the to-be-configured network device and a parameter of a first network device, and wherein obtaining the instantiated configuration data comprises:
    obtaining the parameter of the first network device based on the first configuration command; and
    in response to the parameter of the first network device being obtained, generating the instantiated configuration data based on the first configuration command.

3. The method according to claim 2, further comprising:
    in response to not obtaining the parameter of the first network device, sending the configuration parameter of the to-be-configured network device and the first configuration command to the to-be-configured network device.

4. The method according to claim 1, further comprising:
    receiving a confirmation response message indicating that the instantiated configuration data is correct.

5. The method according to claim 1, further comprising:
    receiving at least one configuration template file from a second network device, wherein the at least one configuration template file comprises the configuration template file.

6. The method according to claim 1, further comprising:
    instructing a backup network device of a different type to back up the configuration template file.

7. The method according to claim 6, further comprising:
    after a third network device of a different type as the primary network device joins in the network, and in response to the attribute information of the third network device meeting a second preset condition, determining that the third network device is a new backup network device; and
    sending the configuration template file to the new backup network device.

8. The method according to claim 7, further comprising:
    in response to the attribute information of the third network device not meeting the second preset condition, generating the instantiated configuration data of the third network device based on the configuration parameter of the third network device and the configuration command in the configuration template file corresponding to the type of the third network device; and
    sending the instantiated configuration data to the third network device.

9. The method according to claim 1, further comprising:
after a third network device of a same type as the primary network device joins in the network, and in response to the attribute information of the primary network device meeting the first preset condition, generating instantiated configuration data of the third network device based on a configuration parameter of the third network device and a configuration command in a configuration template file corresponding to the type of the third network device.

10. The method according to claim 9, further comprising:
in response to the attribute information of the third network device meeting the first preset condition, determining that the third network device is a new primary network device, and clearing the instantiated configuration data.

11. A network system, comprising:
at least one processor; and
a non-transitory memory comprising instructions, wherein the instructions executed by the at least one processor cause the system to:
compare attribute information of a primary network device with attribute information of another network device of a same type before obtaining instantiated configuration data, wherein the primary network device is a spine device configured to perform instantiation configuration on other network devices in a spine-leaf network architecture;
determine that the attribute information of the primary network device meets a first preset condition;
obtain instantiated configuration data based on a configuration parameter of a to-be-configured network device and at least one configuration command comprised in a configuration template file corresponding to a type of network devices of a same type, wherein the at least one configuration command indicates a relationship between the configuration parameter of the to-be-configured network device and a configuration parameter of the another network device; and
instruct the to-be-configured network device to perform configuration based on the instantiated configuration data.

12. The system according to claim 11, wherein the at least one configuration command comprises a first configuration command indicating a relationship between the configuration parameter of the to-be-configured network device and a parameter of a first network device, and the instructions executed by the at least one processor further cause the system to:
obtain the parameter of the first network device based on the first configuration command; and
in response to the parameter of the first network device being obtained, generate the instantiated configuration data of the to-be-configured network device based on the first configuration command.

13. The system according to claim 12, wherein the instructions executed by the at least one processor further cause the system to:
in response to the parameter of the first network device not being obtained, send the configuration parameter of the to-be-configured network device and the first configuration command to the to-be-configured network device.

14. The system according to claim 11, wherein the instructions executed by the at least one processor further cause the system to:
receive a confirmation response message indicating that the instantiated configuration data is correct.

15. The system according to claim 11, wherein the instructions executed by the at least one processor further cause the system to:
receive at least one configuration template file from a second network device, wherein the at least one configuration template file comprises the configuration template file.

16. A network system, comprising:
at least one processor; and
a non-transitory memory comprising instructions, when the instructions executed by the at least one processor cause the system to:
compare attribute information of a primary network device with attribute information of another network device of a same type before obtaining instantiated configuration data, wherein the primary network device is a spine device configured to perform instantiation configuration on other network devices in a spine-leaf network architecture;
determine that the attribute information of the primary network device meets a first preset condition;
obtain instantiated configuration data, wherein the instantiated configuration data is generated based on a configuration parameter of a to-be-configured network device and at least one configuration command comprised in a configuration template file obtained based on a type of the to-be-configured network device, the configuration template file corresponds to a network device of a same type, and the configuration command indicates a relationship between the configuration parameter of the to-be-configured network device and a configuration parameter of the another network device; and
configure the to-be-configured network device based on the instantiated configuration data.

17. The system according to claim 16, wherein the at least one configuration command comprises a first configuration command, the first configuration command indicates a relationship between the configuration parameter of the to-be-configured network device and a parameter of a first network device, and in response to the parameter of the first network device not being obtained, the instructions executed by the at least one processor cause the system to:
receive the configuration parameter of the to-be-configured network device and the first configuration command from the primary network device; and
obtain the instantiated configuration data based on the configuration parameter of the to-be-configured network device, the first configuration command, and the parameter of the first network device.

18. The system according to claim 16, wherein obtaining instantiated configuration data comprises:
obtaining the instantiated configuration data by the primary network device; and
wherein the instructions executed by the at least one processor further cause the system to:
send the instantiated configuration data to the to-be-configured network device.

* * * * *